United States Patent
Troyanker

(10) Patent No.: US 7,031,555 B2
(45) Date of Patent: Apr. 18, 2006

(54) PERCEPTUAL SIMILARITY IMAGE RETRIEVAL

(75) Inventor: Vlad Troyanker, Los Altos, CA (US)

(73) Assignee: Pixlogic LLC, Los Altos, CA (US)

( * ) Notice: Subject to any disclaimer, the term of this patent is extended or adjusted under 35 U.S.C. 154(b) by 181 days.

(21) Appl. No.: 10/378,160

(22) Filed: Feb. 28, 2003

(65) Prior Publication Data

US 2003/0231806 A1 Dec. 18, 2003

Related U.S. Application Data

(63) Continuation of application No. 09/507,477, filed on Feb. 17, 2000, now abandoned, which is a continuation-in-part of application No. 09/364,302, filed on Jul. 30, 1999, now Pat. No. 6,563,959.

(51) Int. Cl.
*G06K 9/54* (2006.01)
*H04N 1/00* (2006.01)
*G06F 17/30* (2006.01)

(52) U.S. Cl. .................. 382/305; 382/162; 382/203; 358/403; 707/3

(58) Field of Classification Search ............... 382/165, 382/190, 209, 219, 282, 305, 162, 170, 195, 382/199, 203, 224, 241; 707/1–10; 358/403
See application file for complete search history.

(56) References Cited

U.S. PATENT DOCUMENTS

| | | | |
|---|---|---|---|
| 4,771,469 A | 9/1988 | Wittenburg | |
| 5,421,008 A * | 5/1995 | Banning et al. | 707/4 |

(Continued)

FOREIGN PATENT DOCUMENTS

| EP | 0713186 A1 | 5/1996 |
|---|---|---|
| WO | WO 88/02158 | 3/1988 |

(Continued)

OTHER PUBLICATIONS

Kuhl, Frank P., et al.; Global Shape Recognition Of 3-D Objects Using A Differential Library Storage; Computer Vision, Graphics, and Image Processing; Jul. 1984; pp. 97-114; vol. 27.

(Continued)

*Primary Examiner*—Daniel Mariam
(74) *Attorney, Agent, or Firm*—Sonnenschein Nath & Rosenthal LLP

(57) ABSTRACT

A system and method indexes an image database by partitioning an image thereof into a plurality of cells, combining the cells into intervals and then spots according to perceptual criteria, and generating a set of spot descriptors that characterize the perceptual features of the spots, such as their shape, color and relative position within the image. The shape preferably is a derivative of the coefficients of a Discrete Fourier Transform (DFT) of the perimeter trace of the spot. The set of spot descriptors forms as an index entry for the spot. This process repeated for the various images of the database. To search the index, a key comprising a set of spot descriptors for a query image is generated and compared according to a perceptual similarity metric to the entries of the index. The metric determines the perceptual similarity that the features of the query image match those of the indexed image. The search results are presented as a scored list of the indexed images. A wide variety of image types can be indexed and searched, including: bi-tonal, gray-scale, color, "real scene" originated, and artificially generated images. Continuous-tone "real scene" images such as digitized still pictures and video frames are of primary interest. There are stand alone and networked embodiments. A hybrid embodiment generates keys locally and performs image and index storage and perceptual comparison on a network or web server.

24 Claims, 12 Drawing Sheets

U.S. PATENT DOCUMENTS

| | | | |
|---|---|---|---|
| 5,517,334 A | 5/1996 | Morag et al. | |
| 5,553,157 A | 9/1996 | Bourguignon et al. | |
| 5,579,471 A | 11/1996 | Barber et al. | |
| 5,586,197 A * | 12/1996 | Tsujimura et al. | 382/162 |
| 5,612,686 A | 3/1997 | Takano et al. | |
| 5,619,596 A | 4/1997 | Iwaki et al. | |
| 5,647,058 A | 7/1997 | Agrawal et al. | |
| 5,666,212 A | 9/1997 | Gilge | |
| 5,684,890 A | 11/1997 | Miyashita et al. | |
| 5,751,286 A * | 5/1998 | Barber et al. | 715/835 |
| 5,754,674 A | 5/1998 | Ott et al. | |
| 5,754,676 A | 5/1998 | Komiya et al. | |
| 5,798,943 A | 8/1998 | Cook et al. | |
| 5,825,910 A | 10/1998 | Vafai | |
| 5,852,720 A | 12/1998 | Gready et al. | |
| 5,852,823 A | 12/1998 | De Bonet | |
| 5,857,030 A | 1/1999 | Gaborski et al. | |
| 5,859,921 A | 1/1999 | Suzuki | |
| 5,872,865 A | 2/1999 | Normile et al. | |
| 5,893,095 A | 4/1999 | Jain et al. | |
| 5,896,462 A | 4/1999 | Stern | |
| 5,899,999 A | 5/1999 | De Bonet | |
| 5,910,999 A | 6/1999 | Mukohzaka | |
| 5,911,139 A | 6/1999 | Jain et al. | |
| 5,913,205 A | 6/1999 | Jain et al. | |
| 5,915,250 A | 6/1999 | Jain et al. | |
| 5,917,940 A | 6/1999 | Okajima et al. | |
| 5,923,776 A | 7/1999 | Kamgar-Parsi | |
| 5,926,568 A | 7/1999 | Chaney et al. | |
| 5,930,783 A * | 7/1999 | Li et al. | 707/1 |
| 5,933,518 A | 8/1999 | Cohen-Solal | |
| 5,933,524 A | 8/1999 | Schuster et al. | |
| 5,933,546 A | 8/1999 | Stone | |
| 5,933,823 A | 8/1999 | Cullen et al. | |
| 5,949,904 A | 9/1999 | Delp | |
| 6,081,276 A | 6/2000 | Delp | |
| 6,181,818 B1 * | 1/2001 | Sato et al. | 382/170 |
| 6,240,423 B1 | 5/2001 | Hirata | |
| 6,246,804 B1 | 6/2001 | Sato et al. | |
| 6,556,710 B1 * | 4/2003 | Pass et al. | 382/170 |
| 6,584,221 B1 * | 6/2003 | Moghaddam et al. | 382/165 |

FOREIGN PATENT DOCUMENTS

| | | |
|---|---|---|
| WO | WO 98/50869 | 11/1998 |
| WO | WO 98/57274 | 12/1998 |
| WO | WO 99/45483 | 9/1999 |
| WO | WO 00/62253 | 10/2000 |

OTHER PUBLICATIONS

J.R. Smith, "Digital Video Libraries and the Internet". IEEE Communications, vol. 37, pp. 99-97, New York, NY, (Jan. 1999).

C. Poynton, "Frequently-Asked Questions about Color", http://home.inforamp.net/~poynton/ColorFAQ.html on Apr. 24, 2000.

C Poynton, "Frequently Asked Questions about Color", © Dec. 30, 1999, http://home.inforamp.net/~poynton/PDFs/ColorFAQ.pdf on Apr. 24, 2000.

C. Poynton, "Frequently Asked Questions About Color", © Jan. 4, 1998, http://home.inforamp.net/~poynton/notes/colour and gamma/Color FAQ.txt on Apr. 24, 2000.

C. Poynton, "Charles Poynton—Color technology", http://home.inforamp.net/~poynton/Poynton-color.html on Apr. 28, 2000.

Carson, Chad; Belongie, Serge; Greenspan, Hayit; and Malik, Jitendra; Region-Based Image Querying, IEEE; 1997; pp. 42-49; 0-8186-7981-6.

Masters, T., Signal And Image Processing With Neural Networks, John Wiley & Sons, 1994, pp 98-101, 115-121, 123-130.

Pratt, W.K., Digital Image Processing, John Wiley & Sons, 1978, pp. 449-451, 597-617.

Stone, H.S., Image Libraries And The Internet, IEEE Communications, Jan. 1999, pp. 99-106, vol. 37, New York, N.Y.

* cited by examiner

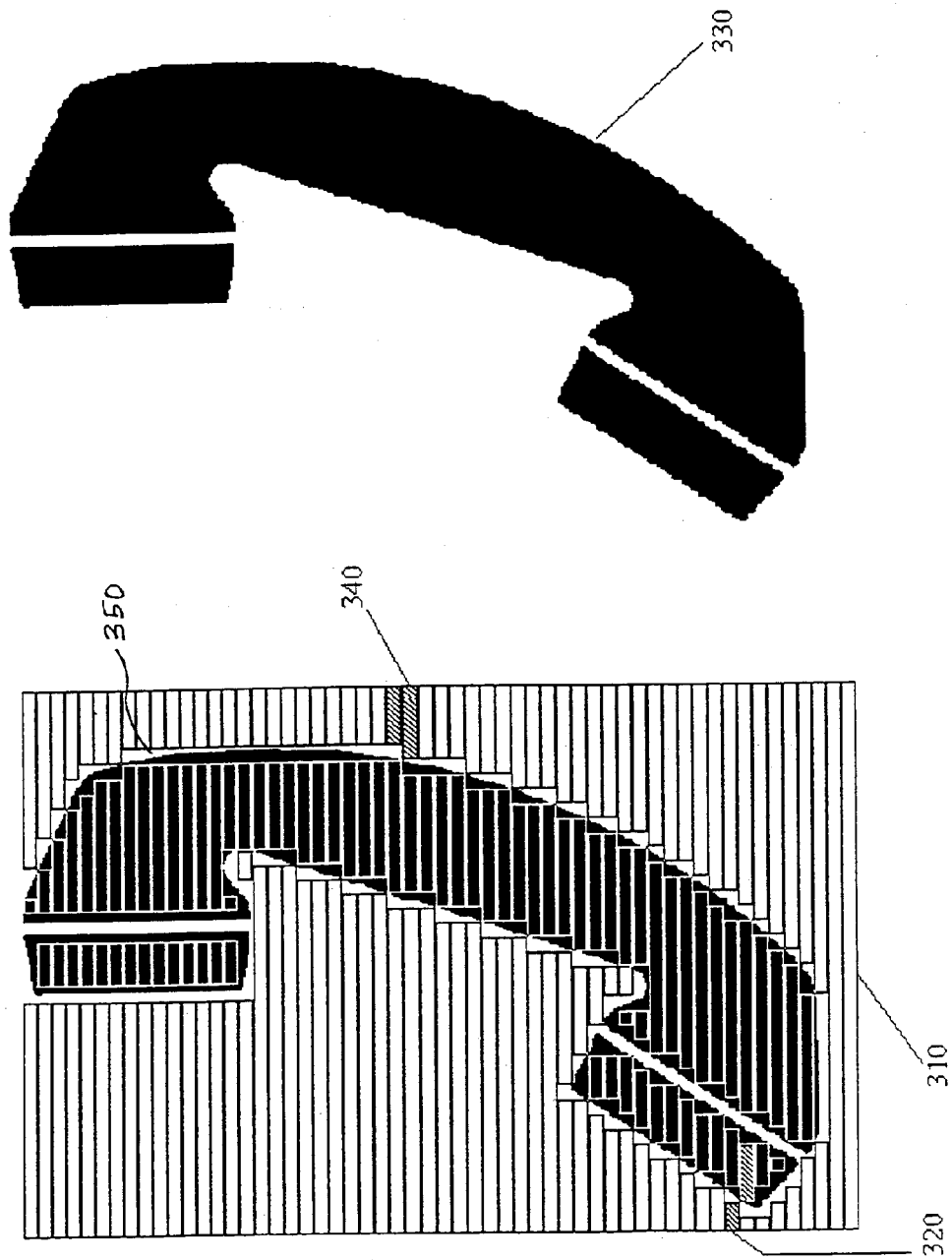

PERCEPTUAL SIMILARITY IMAGE RETRIEVAL

CROSS-REFERENCE TO RELATED APPLICATIONS

This application is a continuation of U.S. patent application Ser. No. 09/507,477 entitled "PERCEPTUAL SIMILARITY IMAGE RETRIEVAL" filed Feb. 17, 2000 (which is now abandoned), which is a continuation-in-part of U.S. patent application Ser. No. 09/364,302 entitled "PERCEPTUAL SIMILARITY IMAGE RETRIEVAL METHOD" by Vlad Troyanker filed Jul. 30, 1999 (which is now U.S. Pat. No. 6,563,959).

AUTHORIZATION WITH RESPECT TO COPYRIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention relates to the analysis and management of visual information. More particularly, the present invention relates to the generation of a searchable image index and to searching such image index according to user specified criteria.

2. Background Art

Various advancements in the electronics and optical arts over the last decade have prompted a dramatic increase in the generation and use of digital images. Image input devices such as scanners and digital cameras have become smarter, easier to use, smaller, and much cheaper and more reliable. Numerous software tools, such as Adobe PhotoShop®, have been developed for processing digital images to improve or otherwise alter their appearance. Moreover, the rapid development of the Internet has vastly increased the volume of digital images available to end users.

Digital images have numerous beneficial features. Digital images can be generated quickly and easily. For example, real world scenes and hardcopy images can be captured using digital cameras and scanners. Digital images are not limited to the reproduction and alteration of real world scenes, and can be artificially generated, for example, by means of computer animation, graphics, and drawing programs. Even text files can be treated as digital images. Unlike conventional photographs, it is extremely easy to copy and distribute digital images.

Due in part to these and other considerations, there is currently a strong demand for improved techniques for identifying digital images that meet user specified criteria. One known technique is to have a person view a plurality of images, determine identifying statements about each image, and store the statements in an index. The text in the index can then be searched to identify images that may illustrate particular features. This technique is highly limited. First, the generation of index entries in this manner is extremely time consuming as someone typically must look at each image and generate the textual index entry. Second, the index entry for an image is highly likely to miss many important features of the image. For example, an image might be indexed as showing a large building, but this would be of little value to someone searching for other items, such as particular people or road signs, that are also shown in the image.

Another class of techniques is Query-By-Pictorial-Example (QBPE) wherein a database or index of images is searched to locate possible matches with a user specified query image. Conventional QBPE techniques have numerous technical problems. First, a user usually must specify criterion for cataloging images on an image by image basis, generally resulting in a long and cumbersome dialog with the cataloging application. The user may be required to identify one or more features present in a particular image and specify these to the cataloging system. For example, the user may specify the distance between the eyes and nose of a person shown in an image relative to the illustrated width of that person's face. This technique usually works poorly, for example, where the indexed images are side views of faces and the query image is a front view of a face. Moreover, such techniques frequently do not accept full color images such as those having 24 bits or more of information per picture element.

These technical problems have prompted the development of various specialty QBPE systems that are adapted to particular needs. As an example, law enforcement frequently uses one type of system for comparing mug shots and another type of system for searching a fingerprint database. While these systems are useful in the particular limited class of images for which they are adapted, the systems fail to address the technical problem of finding matching images or matching portions of images in response to a specified query image where the searched images may contain vastly different types and sizes of objects.

Accordingly, there is urgent need for an improved system and method of general applicability that can locate images containing or likely to contain requested visual information on the basis of a query image. Such improved system and method preferably is capable of identifying various perceptual features of a query image and identifying those images of an image database that likely include some or all of the features. Preferably, the orientation of such features is immaterial both in the query image and variously in the images of the database, so that matching visual information can be identified even if it is translated or rotated in the image plane. Moreover, a high degree of robustness is desired such that rotations relative to the image plane, alterations in size, and contortions of the features of the query image can be identified in the images of the database. To support general applicability to a wide range of users, it is highly desirable for the improved system and method to require a minimal amount of processing power, and thus that computational complexity of the method be reduced relative that of common QBPE systems.

DISCLOSURE OF INVENTION

The present invention solves the technical problems of the prior art with an improved Query-By-Pictorial-Example (QBPE) system and method of general applicability that locates images containing or likely to include the features of a query image. The improved system and method in preferred embodiments processes a digital image to identify various perceptible features, generates descriptors for these features, and stores the descriptors together with a link to the image as an index entry. This process is repeated for a plurality of digital images to create a searchable index. A query image is processed in like manner to generate corresponding descriptors which are compared according to perceptual difference criteria to the stored index entries to determine which images are like the query image.

According to one aspect of the present invention, a match can be obtained even where only some of the features of the query image are identified in an indexed image. Unlike prior art QBPE, the orientation of such features in both the query image and variously in the indexed images is substantially immaterial to the improved system and method. Matching visual information in the indexed images can be identified even if it is translated or rotated in the image plane, and with a high degree of success, even if it is rotated relative to the image plane, reduced or increased in size, folded, or contorted relative to the query image. The present method can beneficially extract the salient perceptual features of an image and is insensitive to irrelevant details and noise.

According to another aspect of the present invention, a method of indexing images according to their visual characteristics comprises the following operations. An array of pixel representations that represent an image is received for processing. The array is processed to determine a plurality of spots associated with the image. A spot comprises a connected region of the image having selected visual characteristics that vary spatially within the connected region by at most a selected tolerance. For each spot, a respective spot descriptor is generated that indicates the visual characteristics of the spot. The plurality of spot descriptors is used as an index entry for the image. The index entry preferably includes a link to the image. The index entry can be stored to a database from which it can be retrieved and compared to search keys. To create a searchable index for a plurality of images, the indexing operation can be repeated for each of the images.

According to another aspect of the present invention, a method of determining spots comprises receiving an array of picture element (pixel) representations that represent an image. The array of pixel representations is partitioned to generate an array of cells. A cell occupies small region of the image and preferably has substantially the same size as the other cells. A plurality of visual characteristics is determined for each cell. These may be, for example, an indication of the average color of the cell determined by processing RGB or L*u*v* data that forms each pixel representation. Cells connected along a first axial direction of the cell's matrix that are suitably similar to one another are joined together to form an interval. The visual characteristics can be treated as suitably similar, for example, if the perceptual difference within the interval differs by at most a first tolerance. This process can be repeated either sequentially or in parallel to generate a plurality of disjoint intervals. Cells which have a high probability of a contour or change in the image appearing therein are natural dividers between intervals. Such cells are treated as intervals in some embodiments of the present invention. Intervals connected along the second axial direction of the array of cells which have visual characteristics that are suitably similar are joined together to determine at least one spot. The visual characteristics of intervals included in a spot preferably vary spatially by at most a second tolerance. The one or more spots thereby determined are then subjected to further processing to generate respective spot descriptors.

According to another aspect of the present invention, a method of generating a description of the shape of a region in a digital image comprises the following operations. An approximation of the shape of the region is generated, with the approximation comprising a plurality of connected cells of like size that intersect the region. A sequence of coordinates along a boundary curve of the approximation is generated. This sequence is transformed to a spectral domain using a spectral transform such as the Discrete Fourier Transformation (DFT) or the Discrete Cosine Transformation (DCT). A plurality of lower frequency spectral coefficients of the transformed sequence is processed to generate the description of the region. In one embodiment, for example, the amplitudes of the eight lowest frequency spectral coefficients arranged in sequence from lowest to highest frequency are used to describe the shape of the region.

According to another aspect of the present invention, a query image in digital form is received for processing. The system generates a plurality of spot descriptors for the query image. These spot descriptors are compared for perceptual similarity with the spot descriptors that form the various stored index entries. The comparison yields a score for each indexed image that indicates its perceptual similarity to the query image. The highest scoring images are presented to the user.

According to another aspect of the present invention, indexing and searching images is achieved in a highly efficient manner. In one personal computer (PC) based embodiment having a programmable microprocessor operating at about 270 MHz, a database having about twenty thousand records typically can be scanned for matching images in about ten seconds. Computational complexity of the processing operations is maintainable well within the capabilities of commonly available processing units, such as Pentium® and PowerPC™ processors. One embodiment of a program kernel for performing indexing and key generation operations by personal computer occupies about one-half megabyte of in-memory storage space. The present invention can also be implemented using any of a wide variety of other architectures including programmable microprocessors, mainframe computers, networked computers, personal digital assistants (PDAs), various embedded systems, and distributed systems such as network and Internet based embodiments.

According to another aspect of the present invention, a machine readable medium carries a program of instructions executable by a machine to perform one or more embodiment of the method of the invention. Such machine readable medium may be, for example, a random access memory (RAM), read only memory (ROM), a hard disk, or an optical disk, that can be accessed by a computer central processing unit or other processing unit. Alternatively, the machine readable medium may be firmware or other embedded encoding of such program in a device that allows a processor coupled therewith to perform one or more embodiment of the method of the invention.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 3A is an illustration of an image of a telephone receiver.

FIG. 3B is an illustration of the generation of a plurality of intervals associated with the image of the telephone receiver of FIG. 3A according to the present invention.

MODES FOR CARRYING OUT THE INVENTION

The present invention provides a system and method for indexing an image collection that support the identification of those images that have features which are perceptually similar to those of a query image. According to the present invention, a plurality of image representations is received and stored in a database. The image representations may conveniently be conventional RGB data for a computer monitor, though other formats such as arbitrary color models including CIE XYZ, HSV, HLS, and YIQ color spaces and CMY and CMYK colorant descriptions can be processed in similar manner. Indexing of the image collection is performed to generate a searchable index. The entries of the index each comprise metadata that identifies the various features of a corresponding image. This is preferably implemented by first converting received data to a perceptually uniform space, such as the standard CIELUV color space defined by the Commission Internationale de l'Eclairage (CIE) in 1976, in conventional manner prior to determining spots and generating corresponding spot descriptors. The CIELUV color space defines three color components L, U, V, which are frequently designated as L*, u*, and v* respectively. Each index entry also includes a link to the corresponding image in the database. To search the database, a query image representation is provided. The query image is processed to determine metadata that identifies the various features of the query image. The metadata is compared to the entries of the index according to perceptual difference criteria to determine which indexed images are the most similar to the query image.

Unlike prior art techniques, the present invention is able to determine salient topological features of an image and determine the relative likeness of such features to the human eye. The present invention is able to break down an image into a plurality of spots, with each spot comprising a connected region of the image. As used herein, a plurality of regions (such as cells, intervals, and/or spots) is said to be connected if the union of the regions is a connected set.

Figure 1A:
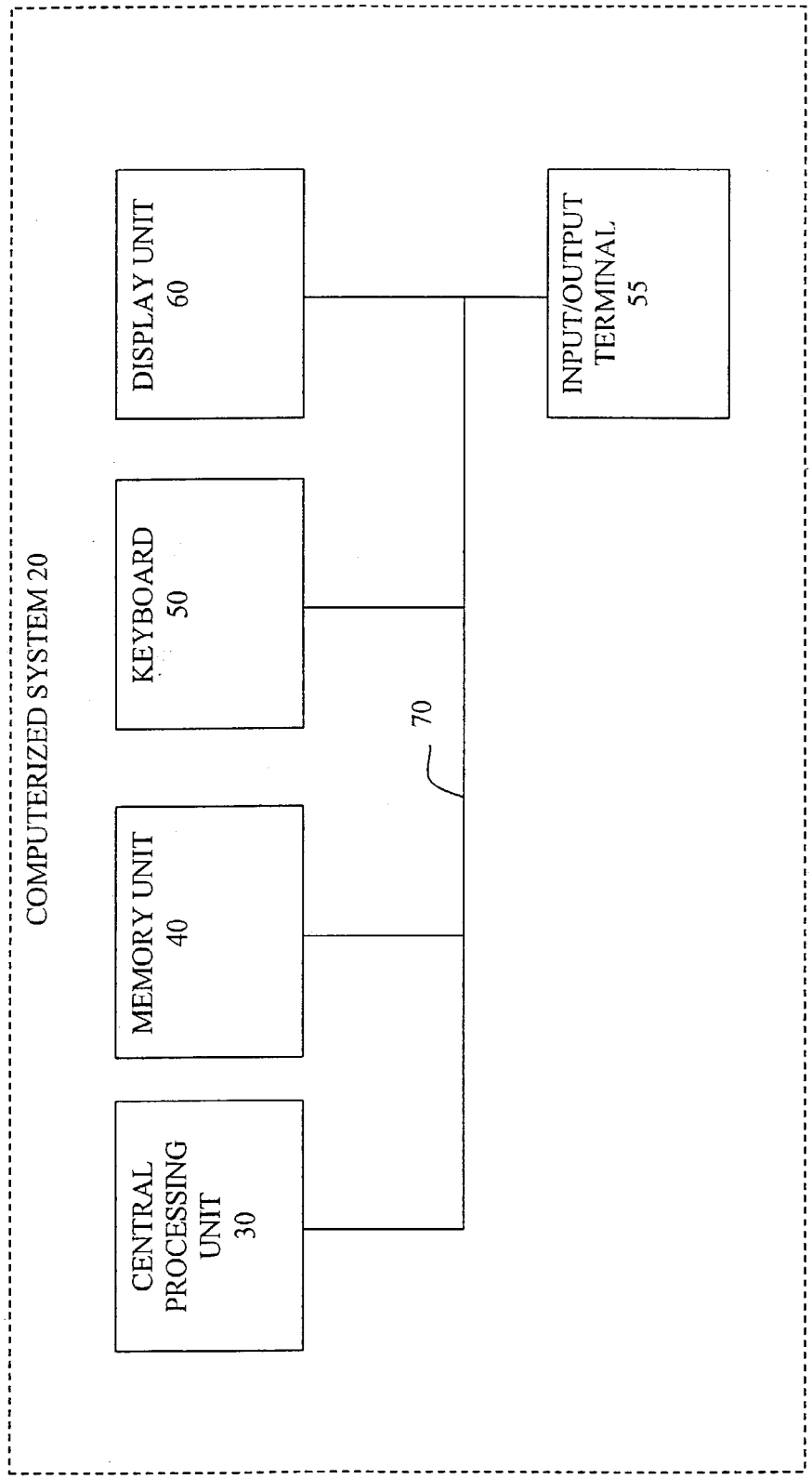
FIG. 1A is a schematic illustration of a computerized system for processing images in accordance with the present invention.

Referring now to FIG. 1A, there is shown an embodiment of a computerized system 20 for implementing the method of the present invention. The computerized system 20 includes a central processing unit 30, a memory unit 40, a conventional keyboard 50, an input/output terminal 55, and a display unit 60, interconnected in conventional manner by a bus 70. The central processing unit 30 can be of virtually any speed and configuration, such as a PowerPC™ microprocessor commercially available from Motorola, Inc., or alternatively, a Pentium®, Pentium® II, or Pentium® III microprocessor commercially available from Intel Corporation. The memory unit 40 comprises a corresponding suitable random access memory (RAM) unit(s) that buffers data and instructions for the central processing unit 30, and preferably also includes a hard disk drive for more permanent storage of programs, received images, and index data. The terminal 55 is disposed for receiving images in digital form, for example, via a conventional scanner, connection to a local network, or a modem or other connection to the Internet. A program of instructions that instructs the central processing unit 30 to process images in accordance with the present invention is supplied via the terminal 55 and loaded into the memory unit 40. The display unit 60 may, for example, be a conventional cathode ray tube (CRT) monitor, a liquid crystal display, or projection type display unit. Interconnection of these components in conventional manner by a bus 70 is well understood by those skilled in the art.

Figure 1B:
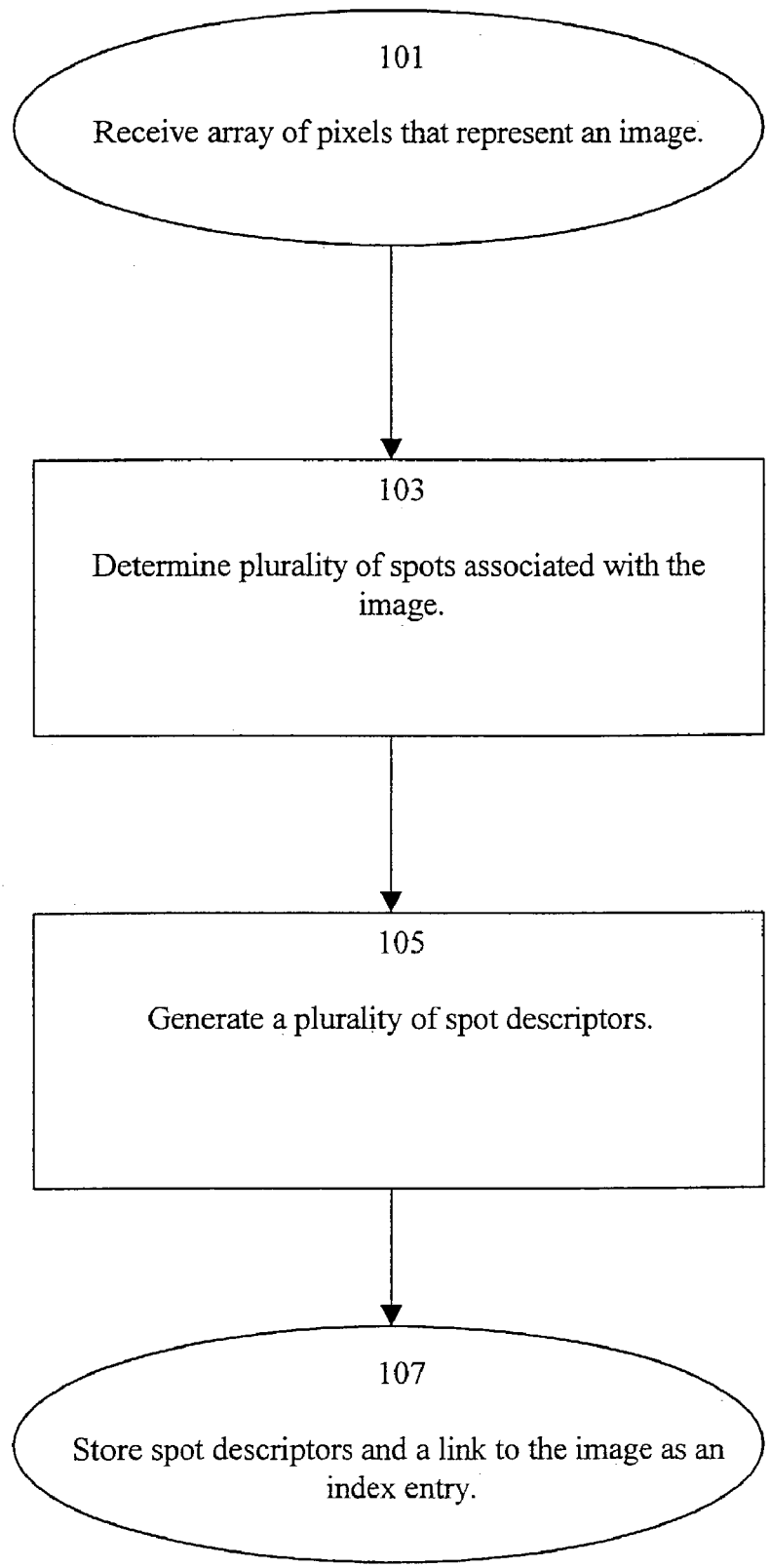
FIG. 1B is a flow chart of an embodiment of a method of indexing images according to their visual characteristics of the present invention.

Referring now also to FIG. 1B, there is shown a flow chart of an embodiment of a method of indexing images according to their visual characteristics of the present invention. In this embodiment, the method is encoded in a program of instructions stored in memory unit 40. The program of instructions instructs the computerized system 20 to perform the following operations. In step 101, an array of pixel representations is received via the terminal 55 and bus 70 and written to the memory unit 40. The array of pixel representations represent one of a plurality of images, which, for example, may be a real world images, computer generated or modified images, or a combinations of such images. The array of pixel representations is processed 103 to determine a plurality of spots associated with the image. A spot comprises a connected region of the image having selected visual characteristics that vary spatially across the connected region within a selected tolerance. Preferably, minor pixel-sized variation is substantially ignored. The spots are processed to generate 105 a plurality of spot descriptors. Each spot descriptor indicates the visual characteristics of a respective spot. The spot descriptors are combined with a link to the corresponding image to generate an index entry for the image. This index entry is written into and stored 107 in the memory unit 40, and the process is repeated on each of the remaining images to create a searchable index.

Figure 1C:
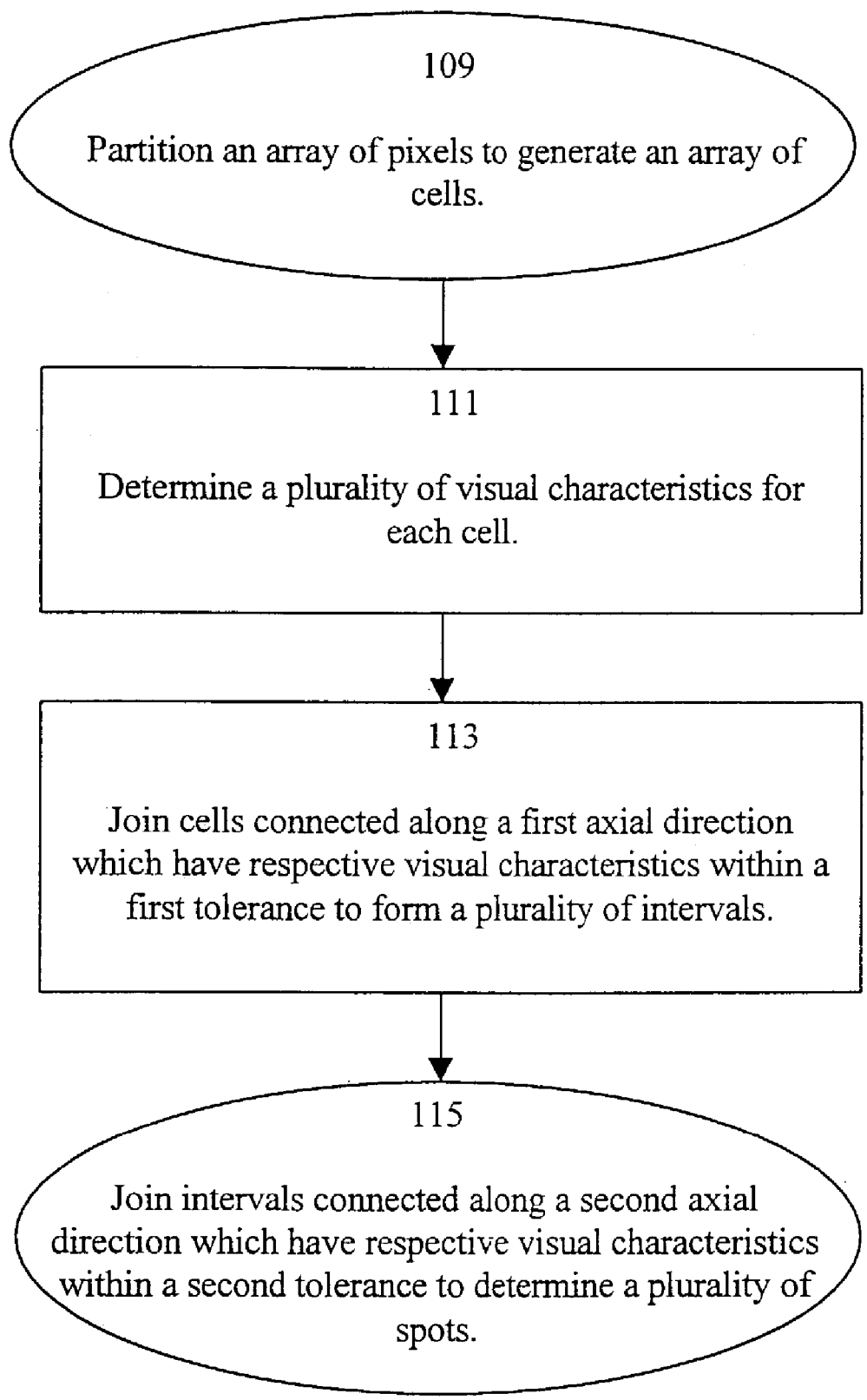
FIG. 1C is another flow chart of an embodiment of a method of determining spots and generating spot descriptors according to the present invention.

Referring now also to FIG. 1C, there is shown a flow chart of an embodiment of a method of determining spots and generating spot descriptors according to the present invention. The array of pixel representations is processed to partition 109 the array of pixel representations into an array of cells. Each cell comprises a connected region of the image. The cells preferably are of like size and have rectangular, square, or hexagonal shape. In this embodiment of the method, the array of cells preferably is two-dimensional and has first and second axial directions. A plurality of visual characteristics of each cell is determined 111. These visual characteristics preferably include a color for each cell, a color dispersion for each cell, a probability estimate that the cell includes a region of the image wherein contour is present in the image (such as along the edge of an illustrated object), and Cartesian coordinates for each cell.

Cells connected together along the first axial direction of the array of cells are joined 113 together along the first axial direction to form an interval provided that the perceptual difference between the cells is within a first tolerance value T1. Cells are not joined in this embodiment of the present invention if the resulting set is not connected. This process is repeated for the entire array of cells, thereby generating a plurality of intervals that run parallel to the first axial direction. Preferably, the generation of intervals proceeds through several iterative stages.

In the first stage, cells connected together along the first axial direction are joined together if the perceptual differences between the cells is within a tolerance T1_S1 for the first stage, where T1_S1<T1. Cells are joined together along the first axial direction so that the resulting intervals run parallel to that direction. The interval may be formed in a series of substages, for example, wherein two connected cells are joined to one another to form an interval, and then a third cell that is connected to one of said two cells is joined to the interval to increase the length of the interval. Visual characteristics are determined for each interval. Preferably, a particular cell in the interval is identified, and the interval is assigned the same visual characteristics as that cell. For example, two cells can be joined to one another to form an interval, the interval assigned the visual characteristics of the leftmost one of the two cells, and an additional cell or cells may be joined to the interval in the first stage provided that the perceptual difference between each such cell and the interval is within the tolerance T1_S1 for the first stage. The perceptual difference between any two cells of the interval will thus be less than the selected tolerance 2×T1_S1.

In the second stage, one or more cells is joined to an interval to increase the length of the interval provided that the perceptual difference between each such cell and the interval is within a tolerance T1_S2 for the second stage, where T1_S1<T1_S2 <T1. To yield an interval, each such cell must either be connected to the interval, or else be connected to another cell joined to the interval. The interval can thus be formed, for example, in a series of substages wherein a first cell that is connected to the interval is joined to the interval, and then a second cell that is connected to the first cell is joined to the first cell and hence to the interval. Connected cells that cannot be joined in this manner to an interval are joined together to form an interval in the second processing stage provided that the perceptual difference between such cells is within the tolerance T1_S2 for the second stage. Preferably, intervals are not joined to other intervals to help retain the likeness of visual characteristics within the final intervals generated by the process. Additional stages can be performed to increase the length of the intervals, wherein in each successive stage the tolerance for the stage is larger than the previous stage. Each unjoined cell remaining after the last stage preferably is treated as an interval.

Where a cell can be joined to two different intervals, it preferably is joined to only one of them. The choice between the two intervals is substantially immaterial as it typically yields at most high frequency noise in the spot extraction process, and such noise can be beneficially suppressed during the generation of spot descriptors, for example, by using an improved zone coding method of the present invention discussed below. The choice can conveniently be consistently either the leftmost (or rightmost) of such intervals according to the present invention.

It is preferable for one of the determined visual characteristics to be an indication of the probability that the cell is disposed in a region of the image wherein a contour is present, such as along the edge of an object illustrated in the image. Such a contour probability can be determined according to the present invention as follows. First, each cell is unrolled by concatenating the row of pixel representations that it encloses to form a sequence of pixel representations. For clarity it is here presumed that each pixel representation is a three dimensional vector (herein data triplet), and thus that the sequence of pixel representations comprises three distinct scalar sequences each having the same length as the sequence of pixel representations. Each of the scalar sequences is low pass filtered separately to remove information that pertains primarily to perturbations, fluctuations or minor variations between pixels. A variance for each of the scalar sequences is determined in conventional manner. The variance indicates the degree of variability in the filtered scalar sequence, and hence indicates the degree of variation across the cell. Each of the three variances of a cell is mapped to a respective intermediate probability estimate, with high variances indicating a high contour probability and low variance indicating a low contour probability. This may be achieved, for example, by normalizing the variances with respect to those of the other cells of the image. The highest of the three intermediate contour probabilities for a cell is treated as the contour probability for that cell.

According to this procedure, cells having contour probabilities above about 50 percent typically become the natural dividers between intervals. This can be used to advantage. For example, in an alternative embodiment of the present invention, any cell having a contour probability above a particular threshold, such as 50 percent, is treated as an interval, and is not joined to other cells. This threshold may be user specified to allow the user to control the importance of image contour during the indexing and/or searching operations.

Intervals connected together along the second axial direction of the array of cells are joined 115 together along the second axial direction to determine a spot provided that the perceptual differences between the intervals is within a second tolerance value T2. A spot preferably is a connected set, and thus intervals are not joined together if the resulting region is not a connected set. The joining operations preferably are repeated either in series or parallel to determine a plurality of spots. Preferably, the generation of spots proceeds through several iterative stages.

In the first stage, intervals connected together along the second axial direction are joined together to determine a spot provided that the perceptual differences between the intervals is within a tolerance T2_S1 for the first stage, where T2_S1<T2. Visual characteristics are determined for each spot. Preferably, a particular interval in the spot is identified and the spot is assigned the same visual characteristics as that interval. For example, two intervals can be joined to form a spot, and the spot assigned the visual characteristics of the topmost one of the two intervals. Additional intervals may be joined to the spot in the first stage provided that the perceptual difference between each such interval and the spot is within the tolerance T2_S1 for the first stage.

In a second stage, intervals connected along the second axial direction with a spot are joined to the spot to increase the size of the spot provided that the perceptual difference between each such interval and the spot is within a tolerance T2_S2 for the second stage, where T2_S1<T2_S2 <T2. Intervals connected together along the second axial direction that have not already joined a spot can be joined together to form a spot in the second processing stage provided that their perceptual difference is within the tolerance T2_S2 for the second stage. Additional stages can be performed to increase the size of the spots, wherein in each successive stage the tolerance for the stage is larger than the previous stage. Each unjoined interval remaining after the last stage can be treated as a spot. In the final stage, connected spots are joined together if their perceptual difference is within the tolerance T2 for that stage. The perceptual difference between any two intervals that are enclosed by a spot will thus be less than or equal to 2×T2, and moreover, the perceptual difference between any two cells enclosed by the spot will thus be less than or equal to 2×(T1+T2), and the visual characteristics of the spot thus vary spatially across the spot at a cellular level within the selected tolerance 2×(T1+T2).

The one or more spots thereby generated are then subjected to further processing to generate respective spot descriptors. In this embodiment of the present invention, a spot descriptor indicates a plurality of visual characteristics of the respective spot. The spot descriptor preferably is a vector or data structure that includes components which represent: the color of the spot, the color dispersion across the spot, the shape of the spot, the Cartesian coordinates of the spot, and the width and height of the spot preferably relative to the total width and height of the image. These characteristics of the spot can be determined in a conventional manner. For example, conventional zone coding may be applied to determine the shape of a spot. An improved zone coding method for determining the shape of a spot in accordance with the present invention is described in detail below. The set of spot descriptors and a link to the corresponding image are then written to and stored in the memory unit 40 as an index entry for the image, and the process is repeated for remaining images to be indexed.

To search the resulting index, a query image is supplied or generated. The query image may, for example, be a scanned or digitally photographed image, one or more features combined from one or more scanned or digitally photographed image, a computer modified image, or even a computer generated image. Spots and spot descriptors for the query image are generated in the above-described manner. These spot descriptors serve as a key which is compared to the entries in the index. This comparison determines the degree of perceptual similarity between the spots of the query image and those of each indexed image. Those indexed images that are most likely to include the features of the query image are displayed on the display unit 60 preferably together with a score that indicates the degree of similarity of the displayed image to the query image.

The method can alternatively be performed on any of a wide variety of processing architectures. The method can, for example, be performed in a network environment, with a server storing an image database, with user nodes connected thereto performing the key identification and searching operations. Alternatively, the method can be performed by an embedded system. For example, the method can be embedded as firmware in an integrated circuit chip. Such integrated circuit chip can be included in a personal digital assistant (PDA), for example, to allow the PDA to perform key identification. The PDA could then link to a database or alternatively to the Internet to search image databases and other image sources according to the present invention responsive to the key generated in the PDA. To support such search operations, the image databases and image sources can be indexed by a network server or Internet site. Alternatively, the PDA may down load images to perform indexing operations and generate the searchable index within the PDA. Where the PDA lacks sufficient resources to buffer large numbers of images, a downloaded image can be discarded once its index entry is generated, and then re-downloaded at a later time, for example, if it is identified as likely having features that match a query image. Networked and Internet embodiments of the present invention are discussed more fully below with respect to FIGS. 7 and 8.

Figure 2A:
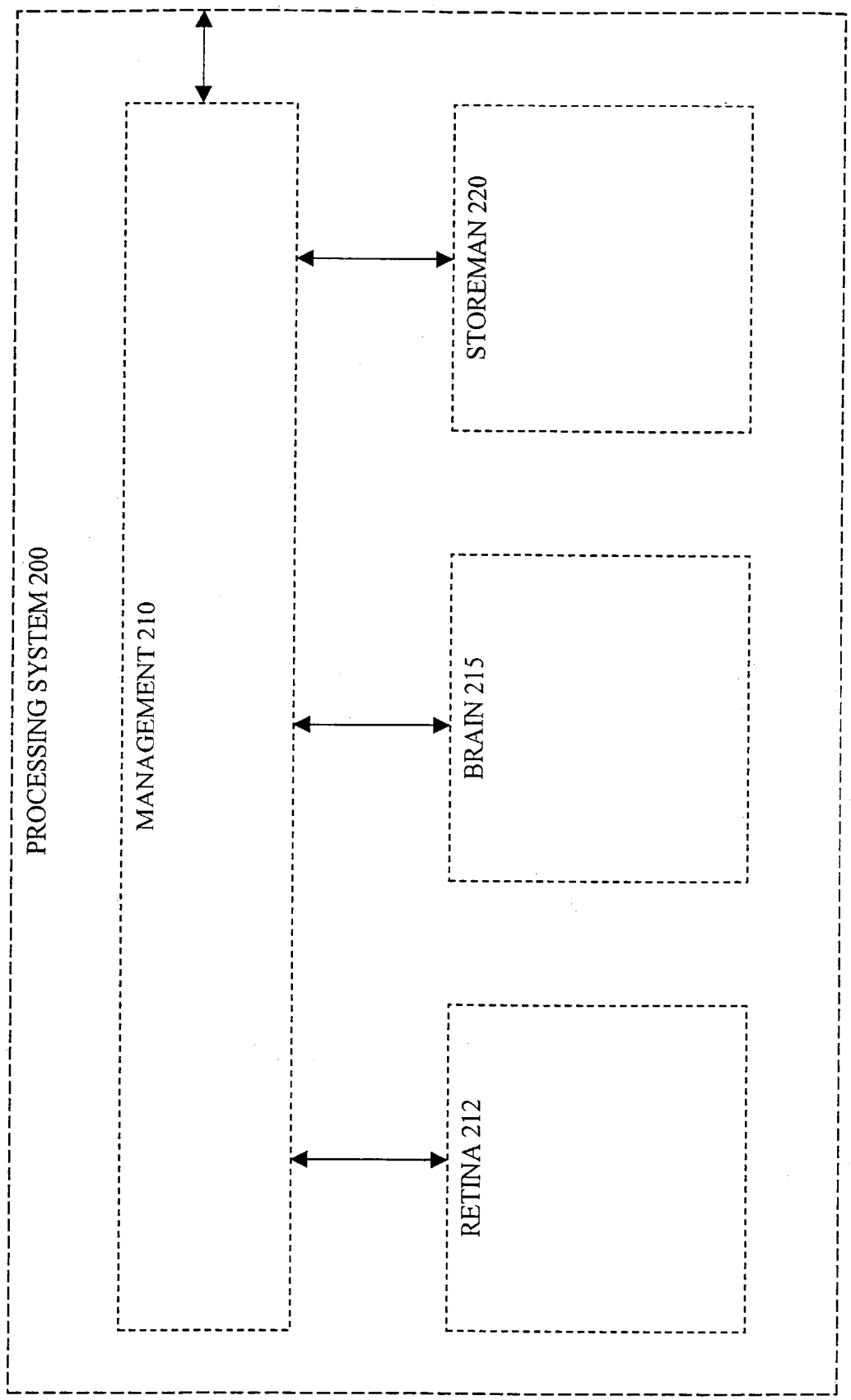
FIG. 2A is a functional block diagram of a preferred embodiment of the present invention showing a plurality of functional modules.
Figure 2B:
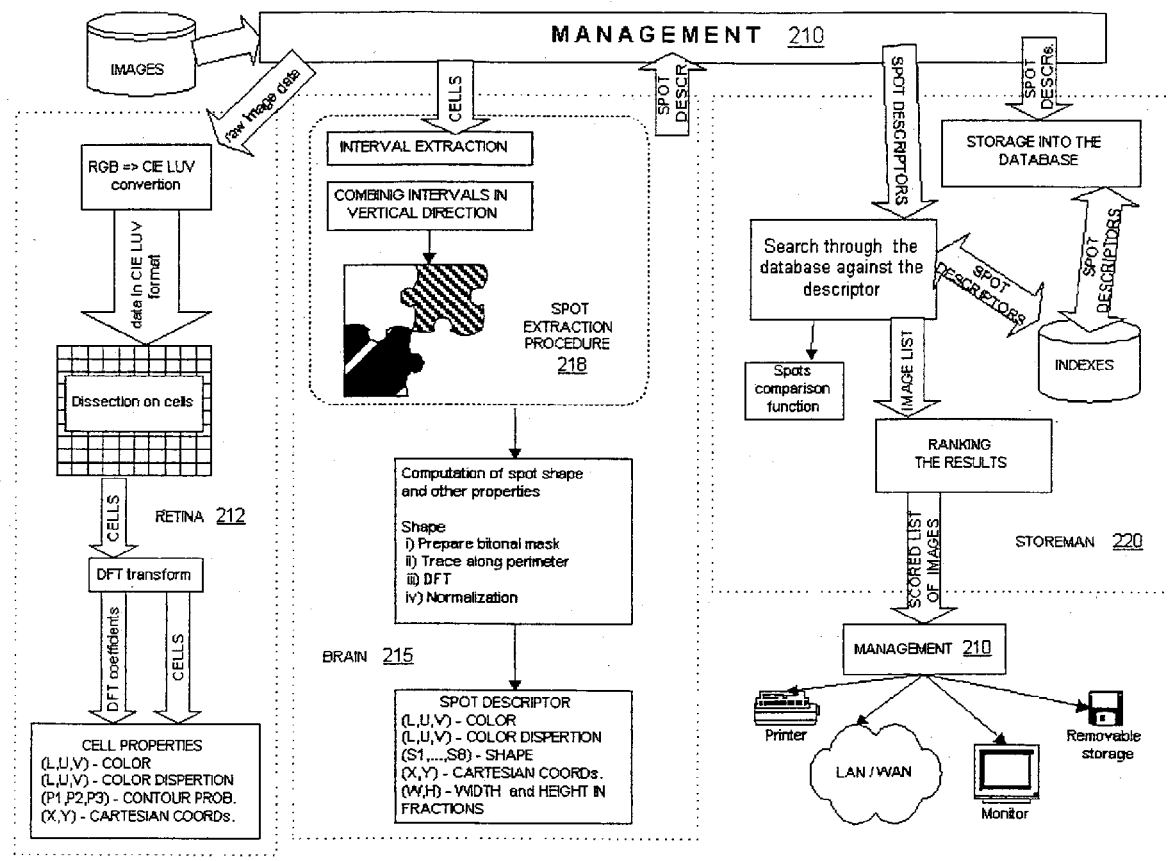
FIG. 2B is a schematic illustration showing data flow between a plurality of functional modules with thick arrows and control flow and control dependencies between the functional modules with thin arrows.

Referring now to FIG. 2A, there is shown a functional block diagram of a preferred embodiment of processing system 200 according to the present invention that includes a plurality of functional modules. Referring now also to FIG. 2B there is a shown a schematic wherein data flow between the plurality of functional modules is shown with thick arrows and control flow and control dependencies between the functional modules with thin arrows. This embodiment of the method can be performed, for example, by the computerized system 20 illustrated in FIG. 1A responsive to a program of instructions (loaded into the memory unit 40) that instructs the computerized system 20 to process images in accordance with the method. It may alternatively be performed by and embedded system such as the above-described PDA embodiment, and by the networked and Internet compatible embodiments discussed below with respect to FIGS. 7 and 8.

In this embodiment of the present invention, the program of instructions includes four modules. The first module designated MANAGEMENT 210 loads and initializes the other modules, passes data between the modules, controls temporary storage of such data, and processes user commands supplied via a keyboard, mouse, or other input device. The second module designated RETINA 212 pre-processes images to convert them to a perceptually uniform and device independent color space, which in this embodiment of the present invention is the standard CIELUV color space defined by the Commission Internationale de l'Enclairage (CIE) in 1976. The CIELUV color space is also designated the CIE L*u*v* color space and is well understood by those having ordinary skill in the art. The third module designated BRAIN 215 processes the L*u*v* color data received from RETINA to extract image content data in a compact informative manner. The image content data is passed to the fourth module designated STOREMAN 220 which indexes and stores the extracted image content data.

According to this embodiment of the method, an image comprising an array of pixel elements (pixels) is received and loaded through MANAGEMENT 210 into system memory. In this embodiment, each pixel identifies (or controls) the amounts of red (R), green (G), and blue (B) light that a corresponding raster display unit provides to illuminate the pixel for display purposes. RGB data is well understood by those having ordinary skill in the art.

The RGB data format was designed primarily for display units, particularly those that display images by supplying colored light. RGB data frequently is device dependent, for example, to reflect the color and intensity qualities of the different colors of phosphorous used in a particular raster display screen. Moreover, RGB color spaces typically are not perceptually uniform. In a perceptually uniform system, a small uniform magnitude change in a system component is substantially equally perceptible across the range of values of the system component. The on-screen volume controls common to current television sets are one example. Each incremental increase in volume typically yields about the same perceptible increase in volume regardless of the initial value of the volume control. It is typically difficult to use RGB data in a method which involves determining perceptual differences because RGB color space typically is neither perceptually uniform nor device independent.

The received image in RGB format is accordingly passed by module MANAGEMENT 210 to module RETINA 212. The module RETINA 212 converts the image to the CIE-LUV color space in a conventional manner, so that the image can be processed in a computationally efficient manner. As is understood by those skilled in the art, the CIELUV color space is both perceptually uniform and device independent. The module RETINA 212 next partitions the image into a plurality of cells. In this embodiment of the method, each cell is a square area of dimensions 8 pixels by 8 pixels, and the cells are disposed edge to edge to form an array preferably in the form of a matrix. Each cell thus encloses 64 pixels and each pixel is represented by an L*u*v* data triplet.

The module RETINA 212 next determines 111 a plurality of visual characteristics of each cell. These visual characteristics preferably include a probability estimate that the cell includes a region of the image wherein contour is present, (such as along the edge of an illustrated object), an average color for each cell, a color dispersion for each cell, and a set of Cartesian coordinates defining a position of each cell within the image.

To determine a probability estimate that a cell includes a region of the image wherein contour changes, the rows of the cell are concatenated from first to last, so that the resulting sequence of 64 data triplets comprises the top row read from left to right, followed by the second row read from left to right, continuing for each successive row, and ending with the bottom row of the cell read from left to right. Other sequencing of the pixels, such as any other concatenation sequence of rows or columns of pixels, can alternatively be used. The concatenation order preferably is the same for each cell of the image, and preferably also for each image that is indexed. The resulting sequence of 64 data triplets forms three 64 point scalar sequences, one sequence comprising the L* color components, a second sequence comprising the u* color components, and the third sequence comprising the v* color components.

A Discrete Fourier Transformation (DFT) preferably implemented using the Fast Fourier Transform (FFT) is performed on the resulting sequence of 64 data triples to generate a discrete spectrum comprising 64 data triplets. The DFT is here performed separately for each coordinate. The discrete spectrum of data triplets thus comprises three 64 point scalar spectrums, one spectrum for the L* color component, a second spectrum for the u* color component, and the third spectrum for the v* color component. The 32 highest frequency spectral coefficients for each scalar spectrum are treated as indications of perturbation, fluctuation or pixel-sized variation between neighboring pixels. These highest frequency spectral coefficients are replaced by zeros to effect a low pass filtering of the sequence of data triplets. A 64 point inverse DFT is performed on the resulting sequence to generate a filtered 64 point spatial representation of the cell that includes information regarding contours in the cell and that substantially suppresses information regarding perturbation, fluctuation, or pixel-sized variation in the cell. The inverse DFT is here performed separately for each color component L*, u*, and v*.

The variance VAR(L*), VAR(u*), VAR(v*) for each color component L*, u*, and v* of the filtered spatial representation is determined. A minimum MIN(c), maximum MAX (c), and maximum variability $MV(c)=MAX(c)-MIN(c)$, where $c\in\{L^*, u^*, v^*\}$, are determined for each of the color components L*, u*, and v*. These are applied to the following polynomial relations to generate respective intermediate probabilities $prob_L$, $prob_U$, $prob_V$ respectively for the L*, u*, and v* color components of the cell:

$$prob_L = 0.0000031537(MV(L^*))^3 - 0.00050454(MV(L^*))^2 + 0.0329MV(L^*), \quad \text{(Eq. 1)}$$

$$prob_U = 0.000000081275(MV(u^*))^3 - 0.000067694(MV(u^*))^2 + 0.0191MV(u^*), \quad \text{(Eq. 2)}$$

$$prob_V = 0.00000021591(MV(v^*))^3 - 0.00011287(MV(v^*))^2 + 0.0198MV(v^*). \quad \text{(Eq. 3)}$$

Figure 2C:
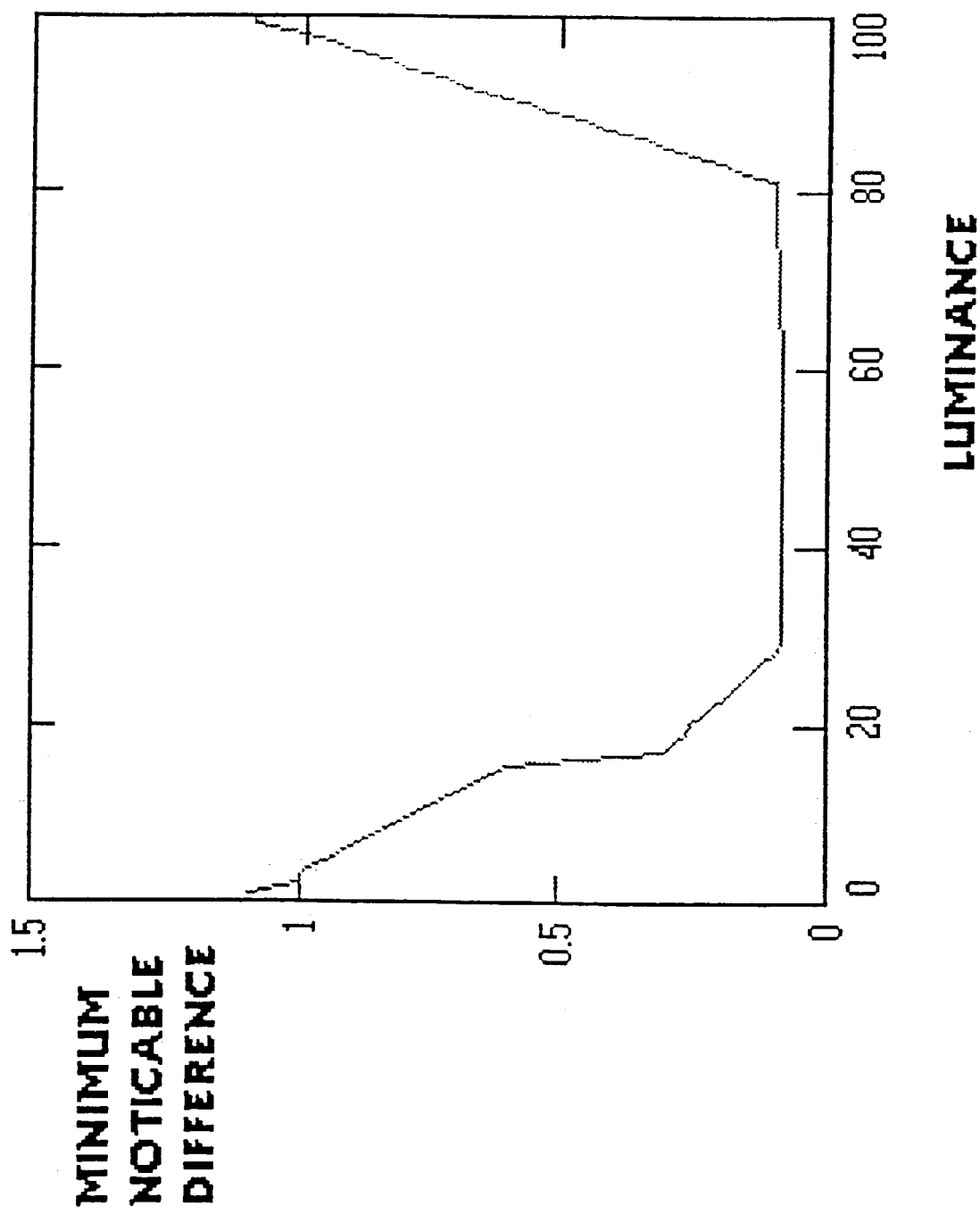
FIG. 2C is a chart of coefficients (designated as Minimum Noticeable Difference) that reflects the human ability to differentiate colors depending on brightness L* of light available with respect to Luminance or brightness L* of light available.

The intermediate probabilities $prob_L$, $prob_U$, $prob_V$ are each multiplied by a respective conventional coefficient that reflects the human ability to differentiate colors depending on the amount of light available. These preferably are determined according to the Weber relation understood by those having ordinary skill in the art. FIG. 2C shows a chart of these coefficients (designated as Minimum Noticeable Difference) with respect to the Luminance. The brightness L* is conveniently here treated as being equal to the Luminance. This results in three scaled intermediate probability estimates, the highest one of which is treated as the contour probability for the cell.

The mean average color AVG(L*), AVG(u*), AVG(v*) for each color component L*, u*, and v* is determined for each cell in conventional manner. The color dispersion D for each cell or other region is determined in conventional manner as:

$$D = \sqrt{\sum_{i=1}^{64}(M-c_i)^2}, \quad \text{(Eq. 4)}$$

where M is the median color across the region, the index i indexes each pixel in the region (and thus ranges from 1 to 64 where the region is a cell), and $c_i$ is the L*u*v* color value at the $i^{th}$ pixel of the region. Finally, coordinates are determined for each cell. In this embodiment of the present invention, each cell is given a Cartesian coordinate determined as the row and column that the cell occupies in the array of cells. By converting to cells, the data volume to be analyzed is reduced by a factor of about 64 in most instances.

The cells and their determined visual characteristics are passed by the module RETINA 212 via the module MANAGEMENT 220 to the module BRAIN 215. The module BRAIN 215 performs spot extraction 218 using the following multistage iterative spot extraction procedure. First, the array of cells is scanned row by row to generate intervals, with each interval comprising either a single cell, or one or more connected cells of similar color and brightness. The following formula is used to determine the color difference CD between a first cell (or other region) having color ($L_1^*$, $u_1^*$, $v_1^*$) and a second cell (or other region) having color ($L_2^*$, $u_2^*$, $v_2^*$):

$$CD = \sqrt{(L_1^* - L_2^*)^2 + (u_1^* - u_2^*)^2 + (v_1^* - v_2^*)^2}. \quad \text{(Eq. 5)}$$

The color differences between the cells of the array range between zero and one-hundred seventy inclusive.

In a first stage of the procedure, connected cells on the same row of the array that have a color difference $CD \leq 5$ are joined together to form intervals. The intervals are assigned the color of their leftmost cell. Once a color is assigned to an interval, the color is not changed even if additional cells are joined to the interval. In a second stage of the procedure, those cells that have a color difference $CD \leq 10$ with respect to an interval that is on the same row of the array as the cells are joined to the interval to increase the length of the interval provided that each such cell is either connected to the interval or is connected to another cell that is joined to the interval. Two or more connected cells that cannot be joined to in this manner with an existing interval are joined together to form an interval provided that their color difference $CD \leq 10$. Note that while a previously unjoined cell can be joined to an interval, two distinct intervals preferably are not joined together in this embodiment of the present invention. Each new intermediate interval is assigned the color of its leftmost cell. In a third stage of the procedure, those cells that have a color difference $CD \leq 15$ with respect to an interval (existing after the second stage) that is on the same row of the array of cells are joined to that interval to increase the length of the interval.

Additional stages can be performed at user discretion. More particularly, the user specifies a tolerance value T1, and the joining operation is repeated, each time with the joining operation occurring if the color difference CD is less than or equal to a current value CV, and the current value CV is increased by 5 in each successive stage until the tolerance value T1 is reached. The procedure can be terminated after the second stage, for example, by setting T1 equal to 8. Any interval formed by joining cells but not intervals in the last stage is assigned the color of its leftmost cell. Any cell not joined to another cell is treated as an interval. Any cell having a contour probability above a user specified percentage is also treated as an interval, which can cause the splitting of a final interval into two or three discrete intervals. By increasing this percentage, the user emphasizes contour features of images, whereas by lowering this percentage, the user emphasizes average color features of images. Note that where a cell can be joined to two different intervals, it preferably is joined to only one of them, which in this embodiment of the present invention is the leftmost one of the two intervals. Again, the choice between the intervals typically yields at most high frequency noise in the resulting spots, and the noise can be filtered off or otherwise suppressed, for example, using the improved zone coding method of the present invention discussed below.

Next, the generated intervals are joined together vertically to determine spots according to a second iterative procedure. In a first stage of the procedure, connected intervals on adjoining rows of the array that have a color difference $CD \leq 5$ are joined together to determine spots. The spots are assigned the color of their topmost interval. Once a color is assigned to a spot, the color is not changed even if additional intervals are joined to the spot. In a second stage of the procedure, one or more intervals that are connected together along a vertical projection with a spot are joined to the spot if they each have a color difference $CD \leq 12$ with respect to the spot. An interval is connected to a spot along a vertical projection if it is connected to the spot or alternatively if it is connected to another interval that is joined to the spot. Further, unjoined intervals that cannot be joined to an existing spot are joined together to determine a spot provided that their color difference $CD \leq 12$. Note that while an unjoined interval can be joined to a spot, spots preferably are not joined together during the first and second stages. Each new spot is assigned the color of its topmost interval, but the color of each spot initiated in the first stage is not changed even if the size of the spot is increased during the second stage.

In a third stage of the procedure, the spots as determined by the second stage (and any intervals from the second stage not included in a spot existing after the second stage) that are connected together along a vertical projection with one or more intervals and that have a color difference CD less than or equal to a second user specified tolerance T2 are joined together to determine the final spots. During the third stage, connected spots are joined together provided that their color difference $CD \leq T2$. One spot may be fully or partially enclosed by another. The tolerances T1 and T2 can both be the same, and accordingly can be specified by the user supplying a single tolerance value T that is used as both T1 and T2. Where an interval can be joined to two different spots, it preferably is joined to only one of them, which in this embodiment of the present invention is the topmost one of the two spots. The choice of which spot the interval is joined to is substantially immaterial as the choice typically yields at most high frequency noise in this spot extraction procedure, and such noise can be suppressed or filtered off during the generation of spot descriptors.

A spot thereby determined comprises a connected group of intervals having relatively the same color and brightness. The intervals that are enclosed by a spot are connected along a vertical projection. A spot connected along more than one vertical projection may, for example, be "U shaped". Referring now also to FIGS. 3A and 3B there are shown an illustration of an image of a telephone receiver 330 and an illustration of the generation of a plurality of intervals associated with the image of the telephone receiver of FIG. 3A according to the present invention. In FIG. 3B, the two intervals designated 340 interlay in vertical projection and are connected. The two intervals designated 320 do not interlay in vertical projection but merely meet at one corner, and are not treated as connected in this embodiment of the present invention. The cells 350 along the right side of the receiver show a strong black to white contour and thus are natural dividers between intervals.

The module BRAIN 215 also generates a spot descriptor for each spot. In this embodiment of the present invention, a spot descriptor is a data structure with entries for several visual characteristics of the corresponding spot. The spot descriptor includes entries for the color of the spot, the color dispersion across the spot, the relative size and position of the spot within the image, and the shape of the spot. The color of a spot for this purpose can be the color assigned in the process of determining the spot. However, in this embodiment of the present invention, the color used here is the mean average color of the colors of each interval that forms the spot, with such intervals having the color assigned to them in the spot extraction procedure discussed above. The color of the spot preferably is represented as an L*u*v* data triplet. The color dispersion across the spot is preferably determined in conventional manner according to Equation 4. The relative size and position of the spot within the image are preferably determined as follows. The relative width of the spot preferably is set equal to the total width of the spot divided by the width of the image. The relative height of the spot preferably is set equal to the total height of the spot divided by the height of the image. The relative position of the spot preferably is a Cartesian coordinate (XR, YR), wherein XR is set equal to the X coordinate of the top left pixel of the spot divided by the width of the image, and YR is set equal to the Y coordinate of the top left pixel of the spot divided by the height of the image. The exact method for determining relative size and position are not important to the present invention, however, the same method should be used for both indexing and searching operations.

A description of the shape of the spot can be prepared using an improved zone coding process in accordance with the present invention. First, a bi-tonal mask of a spot is prepared wherein each cell that forms the spot is represented by one bit in a black and white raster pattern. Each point p of the mask thus represents one cell. The mask is scanned along its perimeter to generate a sequence of perimeter points $(p_1, p_2, \ldots p_n)$. Each perimeter point $p_i$ is comprised of the Cartesian coordinates $(p_{i\_1}, p_{i\_2})$ for that point $p_i$ in the raster pattern for i=1, 2, . . . , n. The sequence of perimeter coordinates $(p_{1\_1}, p_{1\_2}, p_{2\_1}, p_{2\_2}, \ldots, p_{n\_1}, p_{n\_2})$ formed by pairing these coordinates $(p_{i\_1}, p_{i\_2})$ for i=1, . . . , n is periodic because the perimeter is an enclosing path. Second, the Discrete Fourier Transform (DFT) is applied to the complex domain sequence of perimeter coordinates. In the resultant spectrum, amplitudes of the first several spectral coefficients are selected. The sequence consisting of the magnitudes of the first eight spectral coefficients is used to represent the shape of the corresponding spot. These lower frequency spectral coefficients preferably are used to beneficially reduce unnecessary information regarding perturbations, fluctuations, and pixel-sized variations in the image, as well as any noise created by the spot extraction procedure. The number of spectral coefficients selected can alternatively be specified by the user, with additional spectral coefficients typically yielding an increase in precision.

The amplitudes of the spectral coefficients preferably are normalized to be independent of image scale. This is beneficial because image scale may be volatile due to the nature of registration equipment, such as camera focus length. Normalization is performed by dividing the amplitudes of each spectral coefficient by the amplitude of the first spectral coefficient. Where the spot has a convex hull, the amplitude of the first spectral coefficient is believed to be the largest. The amplitude of different spots can be readily compared directly from the normalized amplitudes as scale information has been suppressed.

The improved zone coding method has several advantages over prior art indexing methods. First, the representation of the shape of a spot is extremely compact, eight real numbers are used in the preferred embodiment. The number of values in the representation of the shape of a spot does not depend on the size of the spot or the length of the perimeter of the spot. The representation is substantially free of high frequency noise and is believed to be the closest representation to the shape of the corresponding spot under a square metric sum measure.

Figure 4A:
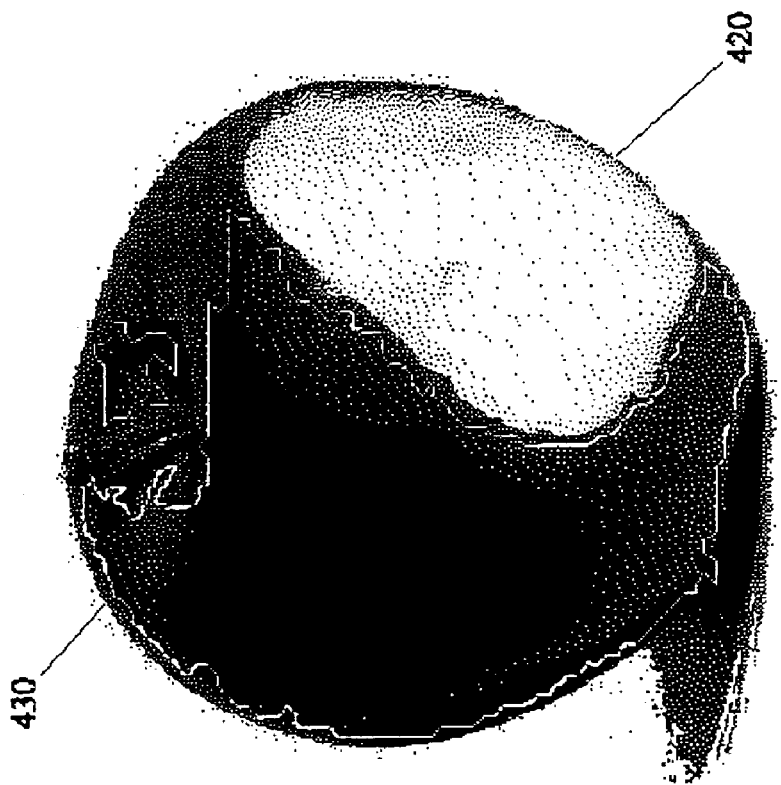
FIG. 4A is an illustration of an image of an apple that shows an outline of a spot determined in accordance with the method of the present invention.
Figure 4B:
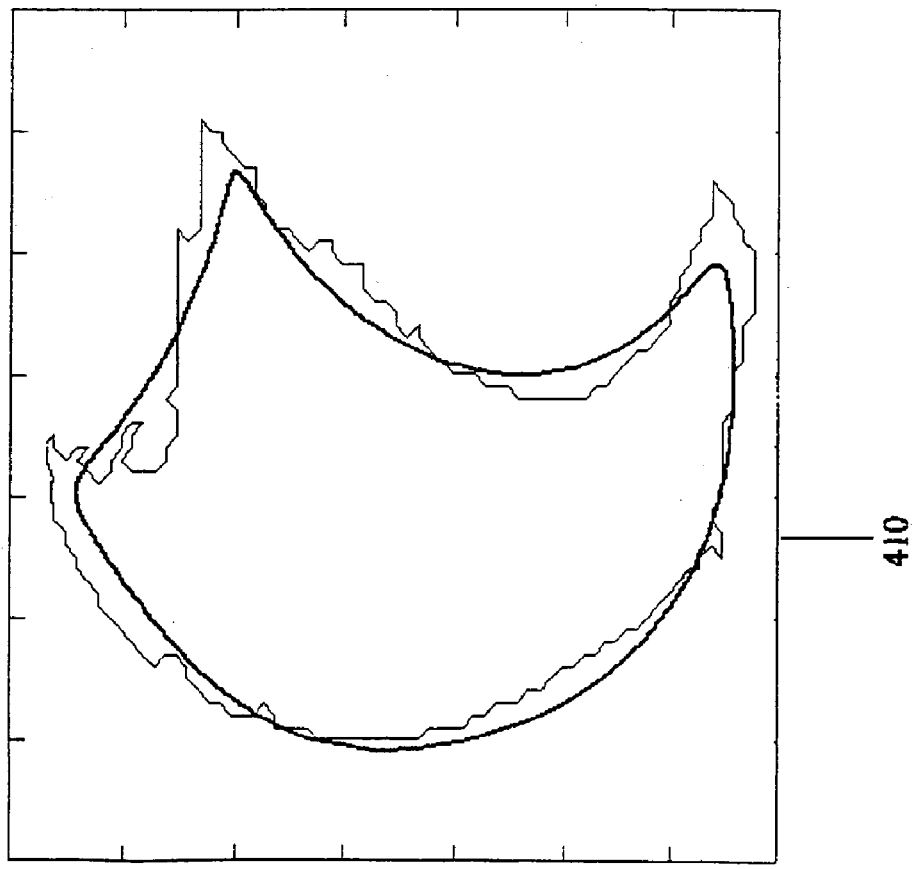
FIG. 4B is an illustration of the outline of the spot of FIG. 4A that also shows a pictorial representation of a corresponding spot descriptor.

Referring now also to FIG. 4A there is shown an illustration of an image of an apple. The outline 430 of a spot generated according to the present invention is shown. The spot corresponds to the visual features of a dark region on the apple. Referring now also to FIG. 4B the outline 430 of the spot and a corresponding visual representation 412 of the 8 number description of the shape of the spot. The visual characteristics formed by taking an inverse DFT of the sequence of eight numbers. The position the visual representation 412 relative to the outline 430 can be determined using the relative size and position entry from the corresponding spot descriptor. It is seen that this embodiment of the method provides an excellent description of the visual characteristics of the spot and uses scant data overhead. The spot descriptors and hence index entries are thus very compact and can be quickly searched. Another highly beneficial feature of the method is its intrinsic segmentation. Any particular spot or set of spots subjected to search can be detected in other images regardless of their context, location, positional rearrangement, rotation, and scale. The method is thus highly versatile.

The module BRAIN 215 passes the spot descriptors via the module MANAGEMENT 220 to the module STOREMAN 220. The module STOREMAN 220 stores the spot descriptors for an image together with a link to the image as an index entry in a database. The index entry may be stored in the database either with or without the corresponding image. This is repeated for each image to be included in the database. The generation of links to images and storage of images and index entries in database formats are well understood by those skilled in the art. The index storage system and method have an open architecture. Thus, routine operations such as memory management, maintenance of database integrity, transaction flow control, and collision detection can be provided in convention manner. Virtually any general purpose Database Management System(s) can be used to implement a database(s) of images and/or corresponding index entries.

STOREMAN 220 also conducts search operations. To search the image database, a query image is provided by the user. Using the RETINA 212 and BRAIN 215 modules, a set of spot descriptors for the image is generated as described above. The set of spot descriptors is used by STOREMAN 220 as a key for searching the image index. As the index entries are each very compact, the index can be searched sequentially very quickly. STOREMAN 220 proceeds as follows. First, an arbitrary indexed image is selected for comparison. The color difference of a spot of the query image and a spot of the indexed image is determined according to Equation 5. Next, a shape difference SD between said spot of the query image and said spot of the indexed image is determined according to:

$$SD = \sum_N |s_n - x_n| \Big/ \sum_N \max(s_n, x_n), \quad \text{(Eq. 6)}$$

wherein $x_1, \ldots, x_n$ are the coefficients representing shape of the spot of the query image, $s_1, \ldots, s_n$ are the coefficients representing shape of the spot of the indexed image, and N is the number of values used in these spot descriptors. A scalar similarity score SSS that expresses the perceptual difference between the spot of the query image and the spot of an indexed image is formed using the color difference CD and shape difference SD. The user can specify the respective importance of the color difference CD and the shape difference SD, but unless otherwise specified by the user, the color difference CD and shape difference SD are treated as equally important, and the scalar similarity score SSS is determined by the formula SSS=SD+CD. Their mutual importance is scaled between 0 and 100 inclusive. This process is repeated for each ordered pair of spots op=(SQ, SI), where SQ is a spot descriptor of the query image and SI is a spot descriptor from an index database, to generate a scalar similarity score $SSS_{op}$ for each such pair op of spots. Scalar similarity scores are merged to generate a score $S_{II}$, for an indexed image II, for example, according to the formula $$S_{II} = \sum_{op \in OP_{II}} SSS_{op}, \qquad \text{(Eq. 7)}$$

where $OP_{II}$ is the set of ordered pairs of spots op=(SQ, SI) such that SQ ranges over the spot descriptors of the query image and SI ranges over the spot descriptors of the particular indexed image II scored. The relative sizes of the spots in query image preferably are compared to those of the indexed image II to generate a size differential SZD for each pair of spots op$\in OP_{II}$. Size differential may be calculated in conventional manner and used as a discriminating factor. For example, to prevent giving a big score to spots which are very small and may not stand for something meaningful in the image, the user may choose not to consider spots which occupy less than a selected percentage, such as seven percent, of the entire picture. The user can specify a size comparison threshold. If the size differential between a spot of the query image and a spot of the indexed image exceeds the comparison threshold, then this pair of spots is not allowed to contribute to the score $S_{II}$ for the indexed image II. Spot hierarchy may optionally be used, for example, to determine whether a background spot is present. Background spots may be useful for determining images which have like backgrounds. Color dispersion of spots can optionally be compared to increase color matching precision. These steps are repeated for each indexed image, or alternatively for a selected portion thereof, and the highest scoring images are presented to the user. For example, images may be presented to the user in full size or thumbnail format on display unit 60 of computerized system 20. The score for each of these images can also be presented to the user at user discretion.

Figure 5B:
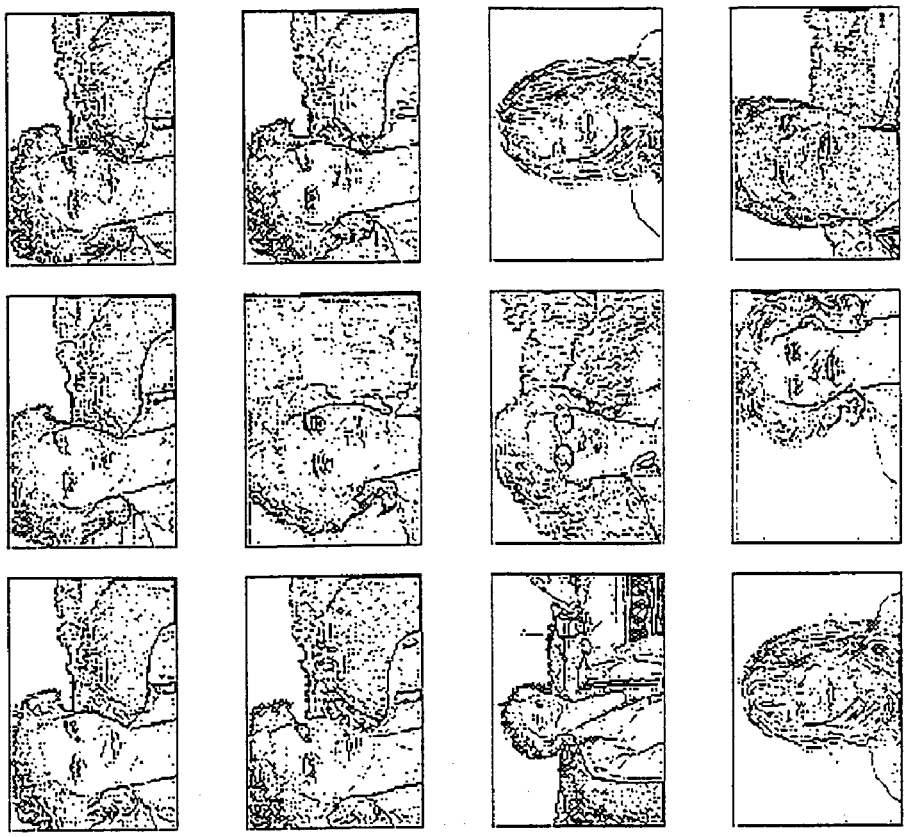
FIG. 5B is an illustration of results of a search in accordance with the present invention that shows a plurality of thumbnails of images in an image database that are likely to include one or more features of the query image of FIG. 5A.
Figure 5A:
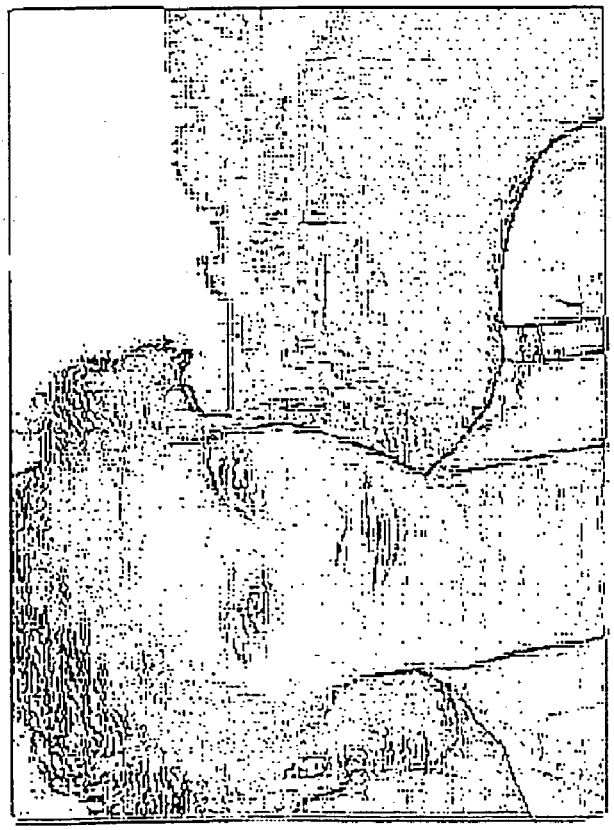
FIG. 5A is an illustration of a query image derived from a video frame.

Referring now to FIGS. 5A and 5B, there are shown respectively an illustration of a query image derived from a video frame, and the results of a search in accordance with the present invention of an image index and database responsive the query image. The results include thumbnails of various images of a person shown in the query image, various other images of people having similar visual features to the person shown in the query image, and images of people in a surrounding context that is similar to that illustrated in the query image.

Figure 6B:
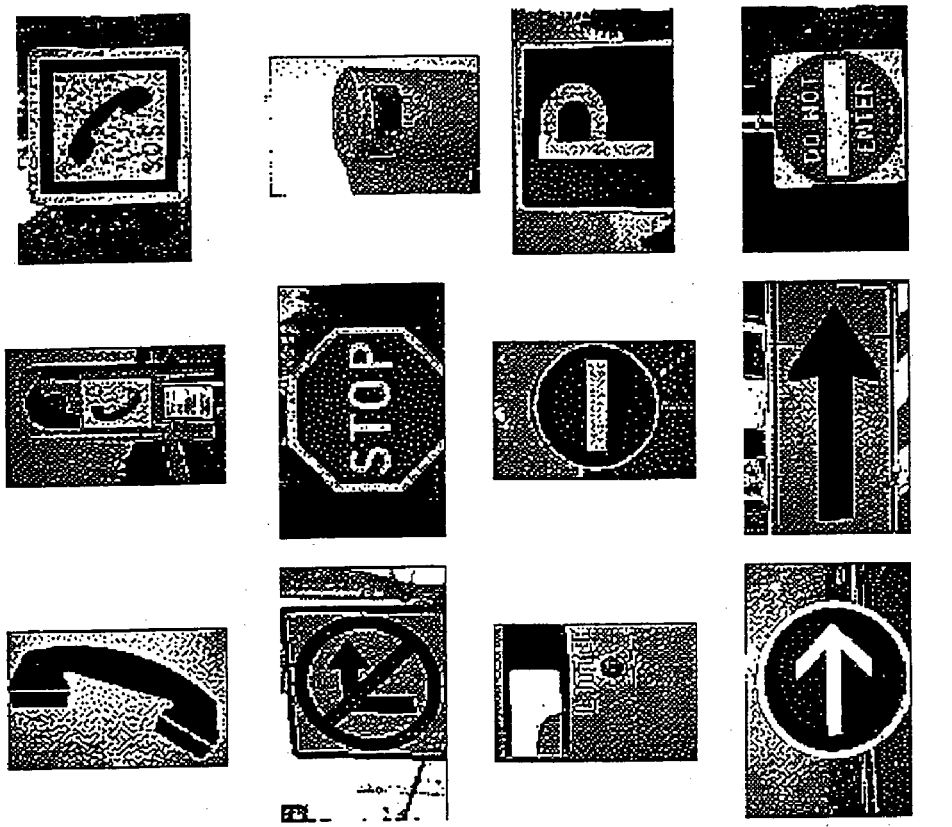
FIG. 6B is an illustration of results of a search in accordance with the present invention that shows a plurality of thumbnails of images in an image database that are likely to include one or more features of the query image of FIG. 6A.
Figure 6A:
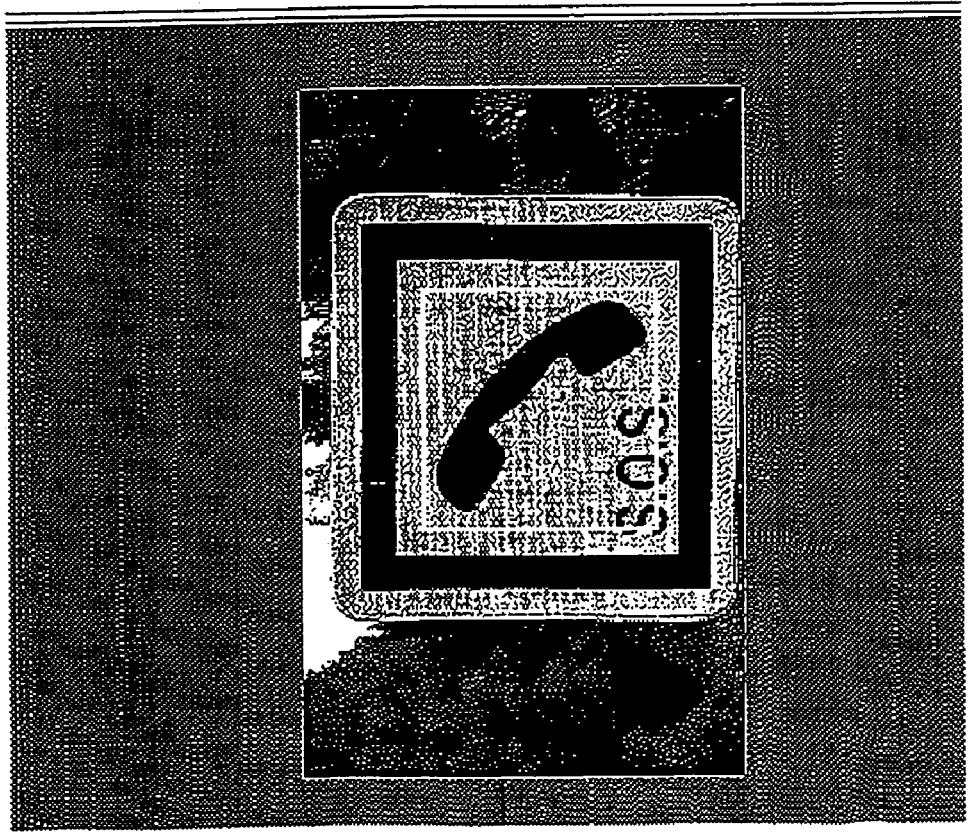
FIG. 6A is an illustration of a query image derived from an image taken with a photographic camera.

Referring now to FIG. 6A, there is shown an illustration of a query image derived from a photograph. The query image shows an illustration of telephone receiver on a road sign. The road sign includes the text string S.O.S., has a square shape, and include a dark hollowed square region near its periphery. Referring now also to FIG. 6B, there is shown the results of a search in accordance with the present invention responsive to the query image of FIG. 6A. The results include thumbnails of various images that include a telephone receiver, various images of road signs, images that have a dark square region, and images having similar context or background as the query image.

The present invention is applicable to a wide variety of image classes, both specific and non-specific image classes, and combinations of image classes within one or more image database. Unlike the prior art, the present invention is well suited for indexing and searching large numbers of non-specific images, such as arbitrary digitized photographs, video frames and streams, images created or modified in graphic editors, images in catalogs, images in archives, images in image warehouses, and combinations thereof. The present invention is also useful for automatically filtering and creating video annotations.

Figure 7:
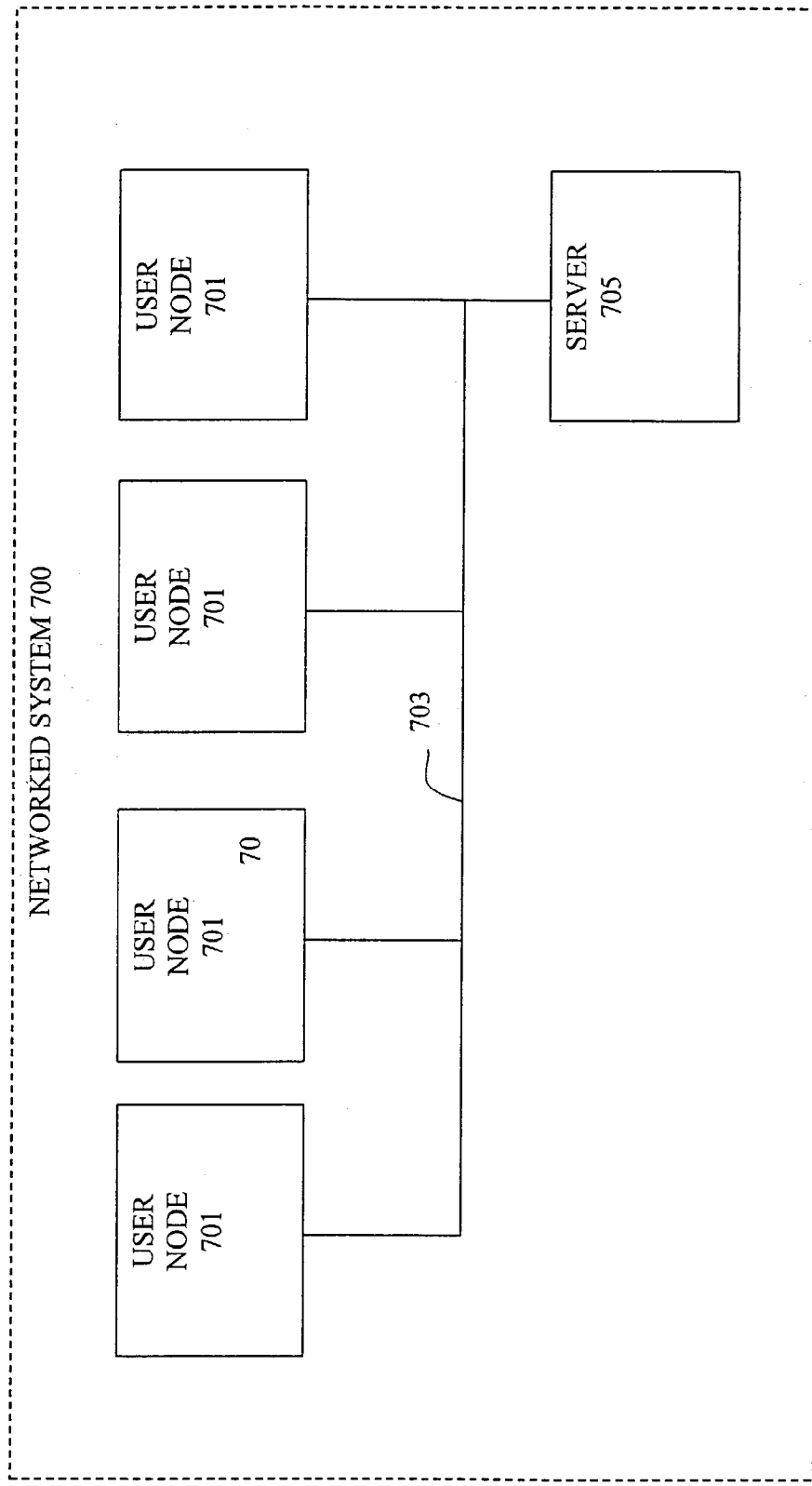
FIG. 7 is a schematic diagram of a computer network embodiment of the present invention.

Referring now to FIG. 7, there is shown a schematic illustration of an embodiment of a networked system 700 according to the present invention. In this embodiment, a plurality of user nodes 701 are coupled by a network interconnect 703 to a server 705. The server 705 stores an image database that is indexed according to the present invention. The server 705 stores a routine for performing searching operations and preferably also a routine for indexing operations according to the present invention. The server 705 also stores an image database that is indexed according to the method of the invention. The indexing can be performed, for example, either within the server in response to the indexing routine or alternatively at a remote site and then downloaded to the server 705. A user node 701 either stores or downloads a program of instructions executable by the node to determine spots and generate spot descriptors and corresponding search keys.

The user of a user node 701 selects a query image (or portion thereof) as a search subject. A corresponding search key for the query image is generated in that user node 701 in response to the loaded instructions. The search key is transmitted via the network interconnect 703 to the server 705. The server 705 searches the image index responsive to the searching routine to determine a set of scores for each indexed image in the database. Thumbnails of highest scoring images and their respective scores are transmitted from the server 705 to that user node 701 and displayed. The user can activate the thumbnails to download the full sized image from the server 705. The server 705 can also load and index the query image into the image database.

The present invention is also beneficial for indexing and searching images via the Internet. There is an urgent need for these features due to the widespread acceptance and rapid development of the Internet as a tool for communication, commerce, and research. For example, numerous business entities, such as Yahoo, Lycos, and Infoseek, provide searching and textual compilation services via the Internet. According to H. S. Stone, "Image Libraries and the Internet", *IEEE Communications,* January 1999, Vol. 37, about 78.7% of Internet traffic currently carries image data. Currently available tools for searching for images via the Internet are at best crude. Most require user supplied textual search strings.

Figure 8:
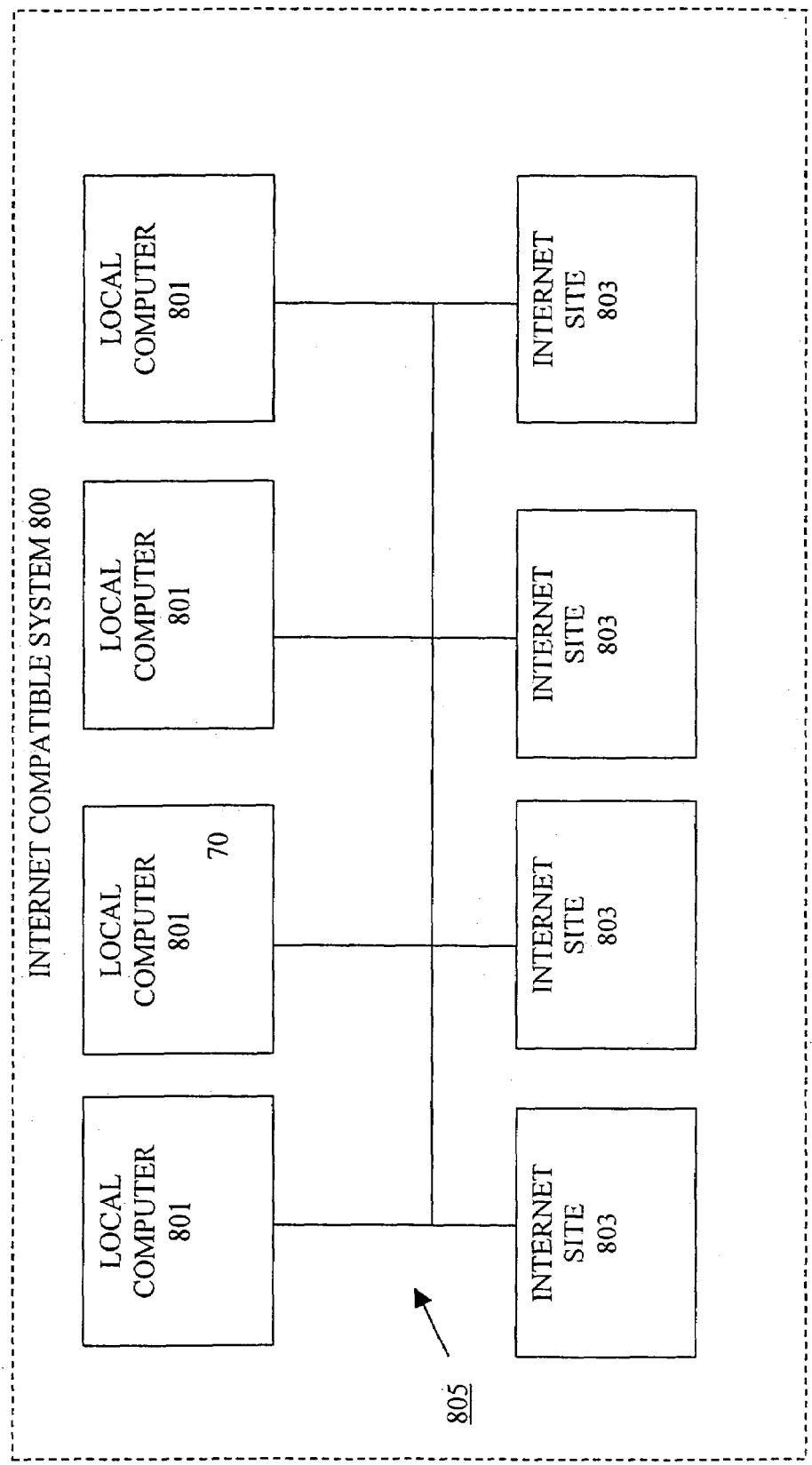
FIG. 8 is a schematic diagram of an Internet based embodiment of the present invention.

Referring now to FIG. 8, there is shown a schematic illustration of an embodiment of an Internet compatible system 800 according to the present invention. System 800 provides users with a generally applicable, highly accurate, and easy to use search tool for searching image databases via the Internet. In system 800, a plurality of local computers 801 and a plurality of Internet sites 803 are interconnected via the Internet 805. Each site 803 is supported by one or more computer server which stores one or more index databases generated according to the present invention and a routine for performing searching and indexing operations according to the present invention. Each site 803 also preferably stores thumbnails of the images that are index. Each local computer 801 either stores or downloads a program of instructions executable by that local computer 801 to determine spots and generate spot descriptors and corresponding search keys. In this embodiment of the present invention, the program is integrated into an Internet browser, for example, as an extension program.

To search an index database, the user of a local computer 801 establishes a connection to the Internet 805, launches the Internet browser, and connects to a participating Internet site 803. The user uses the local computer 801 under direction of the extension program to select a query image as the subject of search. Responsive to the program, the local computer 801 determines a set of spots for the query image and generates a set of spot descriptors which are used as a search key. This may be repeated for a plurality of query images without significantly straining the computational resources of today's typical local computers. Using the Internet browser, the search key is transmitted via the Internet to the site 803. The site conducts a search through its image index according to the present invention, and returns its results in a form of URLs that list addresses where relevant images reside. Thumbnails of the relevant images can also be presented to the user to help him verify accuracy of the results, for example, either by transmitting the thumbnails from the site, or by directing the local computer to another site or server to supply the thumbnails. The searched site preferably also scans the Internet for images, indexes such images, and maintains and updates the index database.

Upon reviewing the application, various modifications and variations of the present invention will be apparent to those skilled in the art. Such modifications and variations are provided for by the present invention, which is limited only by the following claims.

What is claimed is:

1. A method of indexing images according to visual characteristics of the images, the method comprising the steps of:
   receiving an array of pixel representations that represent an image;
   processing the array of pixel representations to determine a plurality of spots associated with the image, each spot comprising a connected region of the image having selected visual characteristics that vary spatially within a selected tolerance;
   generating a plurality of spot descriptors, each spot descriptor indicating the visual characteristics of a respective spot; and
   using the plurality of spot descriptors as an index entry for the image.

2. The method of claim 1, wherein the steps are performed by a programmable processor functionally coupled with a memory unit in response to a program stored in the memory unit.

3. The method of claim 1 wherein the steps are performed by a processing unit in response to a program embedded in the processing unit.

4. The method of claim 1, wherein the steps are performed by an embedded system.

5. The method of claim 1, wherein a first server performs the receiving, processing, generating, and using steps for each of a plurality of images to generate a plurality of index entries, and transmits the plurality of index entries to a second server that searches the plurality of index entries according to user supplied criteria.

6. The method of claim 1, wherein the step of receiving, processing, generating and using are repeated for each of a plurality of images to provide a respective plurality of index entries that index the plurality of images.

7. The method of claim 6, further comprising:
   receiving a second array of pixel representations that represent a query image;
   performing the acts of processing and using on the second array of pixels to determine a second plurality of spot descriptors; and
   comparing the plurality of spot descriptors of the query image to each respective index entry and responsive thereto determining a score that indicates the perceptual similarity of each of the plurality of images to the query image.

8. The method of claim 1, wherein processing the array of pixel representations comprises:
   partitioning the array of pixel representations to generate a plurality of cells, each cell comprising a connected region of the image;
   determining a plurality of visual characteristics of each cell; and
   forming the plurality of spots by joining connected cells where the perceptual difference between the cells joined is within a selected tolerance.

9. The method of claim 1, wherein processing the array of pixel representations comprises:
   partitioning the array of pixel representations to generate a two-dimensional array of cells, each cell comprising a connected region of the image;
   determining a plurality of visual characteristics of each cell;
   generating a plurality of intervals and determining a plurality of visual characteristics for each interval, each interval generated by joining cells connected along a first axial direction that have determined visual characteristics that vary spatially within a first respective tolerance; and
   determining at least one spot associated with the image, each spot determined by joining intervals connected along a second axial direction that have visual characteristics that vary within a second respective tolerance.

10. The method of claim 1, wherein processing the array of pixel representations comprises:
   a) partitioning the array of pixel representations to generate an array of cells, each cell comprising a connected region of the image, the array having first and second axial directions;
   b) determining a plurality of visual characteristics of each cell;
   c) generating an interval having a plurality of visual characteristics by joining cells connected along the first axial direction that have determined visual characteristics which perceptually differ from the visual characteristics of the interval by at most a first tolerance;
   d) repeating step b) to generate a plurality of intervals; and
   e) determining a spot having a plurality of visual characteristics by joining intervals connected along the second axial direction that have determined visual characteristics which perceptually differ from the visual characteristics of the spot by at most a second tolerance.

11. A method of generating a plurality of spots associated with an image, a spot comprising a connected region of the image and having substantially similar visual characteristics, the method comprising: the steps of
   receiving an array of pixel representations;
   partitioning the array of pixel representations to generate an array of cells, the array have first and second axial directions, each cell comprising a like-sized connected region of the image;

determining a plurality of visual characteristics of each cell;

joining cells connected along the first axial direction to form a plurality of disjoint intervals, each interval having visual characteristics that vary by at most a first tolerance; and joining intervals connected along the second axial direction to form at least one spot, each spot having visual characteristics that vary by at most a second tolerance.

12. The method of claim 11, wherein the first tolerance is represented as a degree of perceptual variation.

13. The method of claim 11, wherein the second tolerance is represented as a degree of perceptual variation.

14. The method of claim 11, wherein the steps are performed by a programmable processor functionally coupled with a memory unit in response to a program stored in the memory unit.

15. The method of claim 11 wherein the steps are performed by a processing unit in response to a program embedded in the processing unit.

16. The method of claim 11, wherein the steps are performed by an embedded system.

17. The method of claim 11, wherein the cells are rectangular.

18. The method of claim 11, wherein each cell is square.

19. The method of claim 11, wherein the cells are hexagonal.

20. A method of generating a description of the shape of a region in a digital image, the method comprising the steps of:

generating an approximation of the shape of the region, said approximation comprising a plurality of connected like-sized cells that intersect the region;

generating a sequence of coordinates along a boundary curve of the approximation;

transforming the sequence of coordinates to a spectral domain; and processing a plurality of lower frequency spectral coefficients of the transformed sequence to generate the description of the region.

21. The method of claim 20, wherein the processing step comprises determining an amplitude of each of the plurality of lower frequency spectral coefficients and using the determined amplitudes as the description of the region.

22. A computer readable medium carrying instructions executable by a computer to perform a method of indexing images according to visual characteristics of the images, the method comprising the steps of:

receiving an array of pixel representations that represent an image;

processing the array of pixel representations to determine a plurality of spots associated with the image, each spot comprising a connected region of the image having selected visual characteristics that vary spatially within a selected tolerance;

generating a plurality of spot descriptors, each spot descriptor indicating the visual characteristics of a respective spot; and using the plurality of spot descriptors as an index entry for the image.

23. A computer readable medium carrying instructions executable by a computer to perform a method of generating a plurality of spots associated with an image, each spot comprising a connected region of the image having substantially uniform visual characteristics, the method comprising the steps of:

receiving an array of pixel representations;

partitioning the array of pixel representations to generate an array of cells, the array having first and second axial directions, each cell comprising a like-sized connected region of the image;

determining a plurality of visual characteristics of each cell;

joining cells connected along the first axial direction to form a plurality of disjoint intervals, each interval having visual characteristics that vary spatially by at most a first tolerance; and joining intervals connected along the second axial direction to form at least one spot, each spot having visual characteristics that vary spatially by at most a second tolerance.

24. A computer readable medium carrying instructions executable by a computer to perform a method of generating a description of a shape of a region in a digital image, the method comprising the steps of:

generating an approximation of the shape of the region, said approximation comprising a plurality of connected like-sized cells that intersect the region;

generating a sequence of coordinates along a boundary curve of the approximation;

transforming the sequence of coordinates to a spectral domain; and processing a plurality of lower frequency spectral coefficients of the transformed sequence to generate the description of the region.

* * * * *